US005646927A

United States Patent [19]

Shimizu et al.

[11] Patent Number: 5,646,927

[45] Date of Patent: Jul. 8, 1997

[54] PACKAGED PHOTOGRAPHIC FILM WITH A PLURALITY OF LIQUID CRYSTAL RECORDING REGIONS

[75] Inventors: Osamu Shimizu; Minoru Utsumi; Yuudai Yamashita; Hironori Kamiyama; Shinichi Sakano; Masato Okabe, all of Tokyo, Japan

[73] Assignee: Dai Nippon Printing Co., Ltd., Tokyo, Japan

[21] Appl. No.: 542,954

[22] Filed: Oct. 13, 1995

[30] Foreign Application Priority Data

| | | | |
|---|---|---|---|
| Oct. 14, 1994 | [JP] | Japan | 6-274233 |
| Oct. 14, 1994 | [JP] | Japan | 6-274234 |
| Oct. 14, 1994 | [JP] | Japan | 6-274235 |

[51] Int. Cl.[6] H04N 9/82; G11B 7/00

[52] U.S. Cl. 369/99; 369/100; 369/120; 369/273; 369/280; 365/108; 349/2

[58] Field of Search 365/112, 108; 359/471, 250, 252, 72; 369/99, 288, 120, 100, 273, 280; 430/20, 31, 48, 56, 45, 46, 60, 59, 495, 270; 358/49

[56] References Cited

U.S. PATENT DOCUMENTS

| | | | |
|---|---|---|---|
| 5,191,408 | 3/1993 | Takanashi et al. | 358/49 |
| 5,279,932 | 1/1994 | Miyasaka et al. | 430/495 |
| 5,424,156 | 6/1995 | Aoki et al. | 430/59 |
| 5,439,768 | 8/1995 | Matsuo et al. | 430/56 |
| 5,488,601 | 1/1996 | Sakano et al. | 369/120 |
| 5,516,607 | 5/1996 | Iijima et al. | 430/20 |

FOREIGN PATENT DOCUMENTS

| | | |
|---|---|---|
| 1-289975 | 11/1989 | Japan . |
| 1-290366 | 11/1989 | Japan . |
| 3-192288 | 8/1991 | Japan . |

*Primary Examiner*—Georgia Y. Epps
*Assistant Examiner*—Kim-Kwok Chu
*Attorney, Agent, or Firm*—Sughrue, Mion, Zinn, Macpeak & Seas

[57] ABSTRACT

A packaged integrated information recording system has a plurality of information recording media radially arranged on a disk substrate. Each of the recording media comprises a liquid crystal recording medium including a liquid crystal-polymer composite layer with polymer balls filled in a liquid-crystal phase, stacked on a first electrode layer and a photoelectric sensor including a second electrode layer and a photoconductive layer formed on a transparent substrate. The liquid crystal recording medium and photoelectric sensor are stacked directly, or through an interlayer on each other while the liquid crystal recording layer and photoconductive layer are opposed to each other. The recording media may also be arranged in a row on a film substrate provided with feed holes on both side edges and received in a closable case such that it can be drawn. Alternatively, the recording media on a film substrate may be received in a packaging case having a window openable and closable by a shutter to unroll the film. Alternatively, the information recording media may be arranged in a row on a card substrate and fixedly received in a packaging case having window openable and closable by a shutter. The above arrangements allow images to be successively recorded by exposure to light and read.

10 Claims, 23 Drawing Sheets

PACKAGED PHOTOGRAPHIC FILM WITH A PLURALITY OF LIQUID CRYSTAL RECORDING REGIONS

BACKGROUND OF THE INVENTION

The present invention relates generally to an integrated type of information recording system including a photoelectric sensor and a liquid crystal recording medium stacked on each other, in which the orientation of the liquid crystal recording medium is varied for recording images, and more particularly to a packaged type of integrated information recording system having a plurality of integrated information recording media radially arranged on a disk substrate.

Information recording and reproducing methods, for instance, are disclosed in JP-A 1-290366 and JP-A 1-289975. As disclosed, a photoelectric sensor comprising a photo-conductive layer having an electrode on its front side is opposed, on the optical axis, to an information recording medium comprising a charge carrier layer having an electrode on its rear side. Then, while voltage is applied across both electrodes, the recording information medium is exposed to light to record electrostatic charges on the charge carrier layer depending on the incident optical image. Thereafter, the electrostatic charges are reproduced by toner development or potential reading. A method for making the recorded electrostatic charges visible, for instance, is disclosed in JP-A 3-192288. As disclosed, the charge carrier layer is formed of a thermoplastic resin layer. Then, the thermoplastic resin layer is heated after the electrostatic charges have been recorded on its surface, thereby forming a frost image on that surface.

Furthermore, the applicant has already filed Japanese patent application Nos. 4-3394, 4-24722 and 5-266646 for an information recording and reproducing method using an information recording medium constructed from a liquid crystal-polymer composite layer rather than the above-mentioned information recording layer. As above mentioned, the composite layer is exposed to light at an applied voltage to enable an electric field to be formed by the photoelectric sensor, so that the liquid crystal layer can be oriented for recording information. The thus recorded information can be reproduced in visible form by transmitted or reflected light. With this information recording and reproducing method, the recorded information may be visualized without recourse to a polarizing plate.

Incidentally, the thicknesses of the liquid crystal recording medium and photoelectric sensor are on the order of about 6 μm and about 10 μm, respectively, and so the integrated type information recording system has a total thickness as thin as 20 μm or less. Never until now is equipment reported, which enables such a recording system to be built in or mounted on a camera so as to take pictures with ease.

SUMMARY OF THE INVENTION

One object of the present invention is therefore to enable an integrated type of information recording media to be integrated in disk form so that they can be built in or mounted on a camera or the like.

Another object of the present invention is to package an integrated type of information recording media on a film substrate in a matrix pattern.

Still another object of the present invention is to package an integrated type of information recording media on a card substrate in a matrix pattern.

According to one aspect of the present invention, there is provided a packaged type of integrated information recording system, characterized by including a plurality of rectangular, integrated information recording media radially arranged on a disk substrate centrally provided with a hole, wherein each of said information recording media comprises a liquid crystal recording medium including a liquid crystal-polymer composite layer, with polymer balls filled in a liquid crystal phase, stacked on a first electrode layer and a photoelectric sensor including a second electrode layer and a photoconductive layer formed on a transparent substrate, said liquid crystal recording medium and said photoelectric sensor being stacked directly, or through an interlayer, on each other while said liquid crystal recording layer and said photoconductive layer are opposed to each other, and said disk substrate being rotatably received in a packaging case having a window portion openable and closable by a shutter.

According to another aspect of the present invention, there is provided a packaged type of integrated information recording system, characterized by including a plurality of rectangular, integrated information recording media arranged in a row on a film substrate having feed holes on both side edges, wherein each of said information recording media comprises a liquid crystal recording medium including a liquid crystal-polymer composite layer, with polymer balls filled in a liquid crystal phase, stacked on a first electrode layer and a photoelectric sensor including a second electrode layer and a photoconductive layer formed on a transparent substrate, said liquid crystal recording medium and said photoelectric sensor being stacked directly, or through an interlayer, on each other while said liquid crystal recording layer and said photoconductive layer are opposed to each other, and said film substrate being received in a tightly closable packaging case such that it can be drawn therefrom.

According to a further aspect of the present invention, there is provided a packaged type of integrated information recording system, characterized by including a plurality of rectangular, integrated information recording media arranged in a row on a film substrate having feed holes on both side edges, wherein each of said information recording media comprises a liquid crystal recording medium including a liquid crystal-polymer composite layer, with polymer balls filled in a liquid crystal phase, stacked on a first electrode layer and a photoelectric sensor including a second electrode layer and a photoconductive layer formed on a transparent substrate, said liquid crystal recording medium and said photoelectric sensor being stacked directly, or through an interlayer, on each other while said liquid crystal recording layer and said photoconductive layer are opposed to each other, and said film substrate being received in a packaging cassette having a shutter openable and closable by a shutter such that it can be unrolled therefrom.

According to a still further aspect of the present invention, there is a packaged type of integrated information recording system, characterized by including a plurality of rectangular, integrated information recording media arranged on a card substrate in matrix form, wherein each of said information recording media comprises a liquid crystal recording medium including a liquid crystal-polymer composite layer, with polymer balls filled in a liquid crystal phase, stacked on a first electrode layer and a photoelectric sensor including a second electrode layer and a photoconductive layer formed on a transparent substrate, said liquid crystal recording medium and said photoelectric sensor being stacked directly, or through an interlayer, on each other while said liquid crystal recording layer and said photoconductive layer are opposed to each other, and said card substrate being fixedly received in a packaging case having a window portion openable and closable by a shutter.

BRIEF DESCRIPTION OF THE DRAWINGS

FIGS. 3(A)–3(E) are sectional views showing an integrated type of information recording system according to the present invention.

DESCRIPTION OF THE PREFERRED EMBODIMENT

Throughout the specification, the wording "a plurality of rectangular, integrated information recording media arranged in a row on a substrate" is understood to mean that an array of integrated information recording media are arranged on a substrate in a spaced relation to each other.

Figure 1:
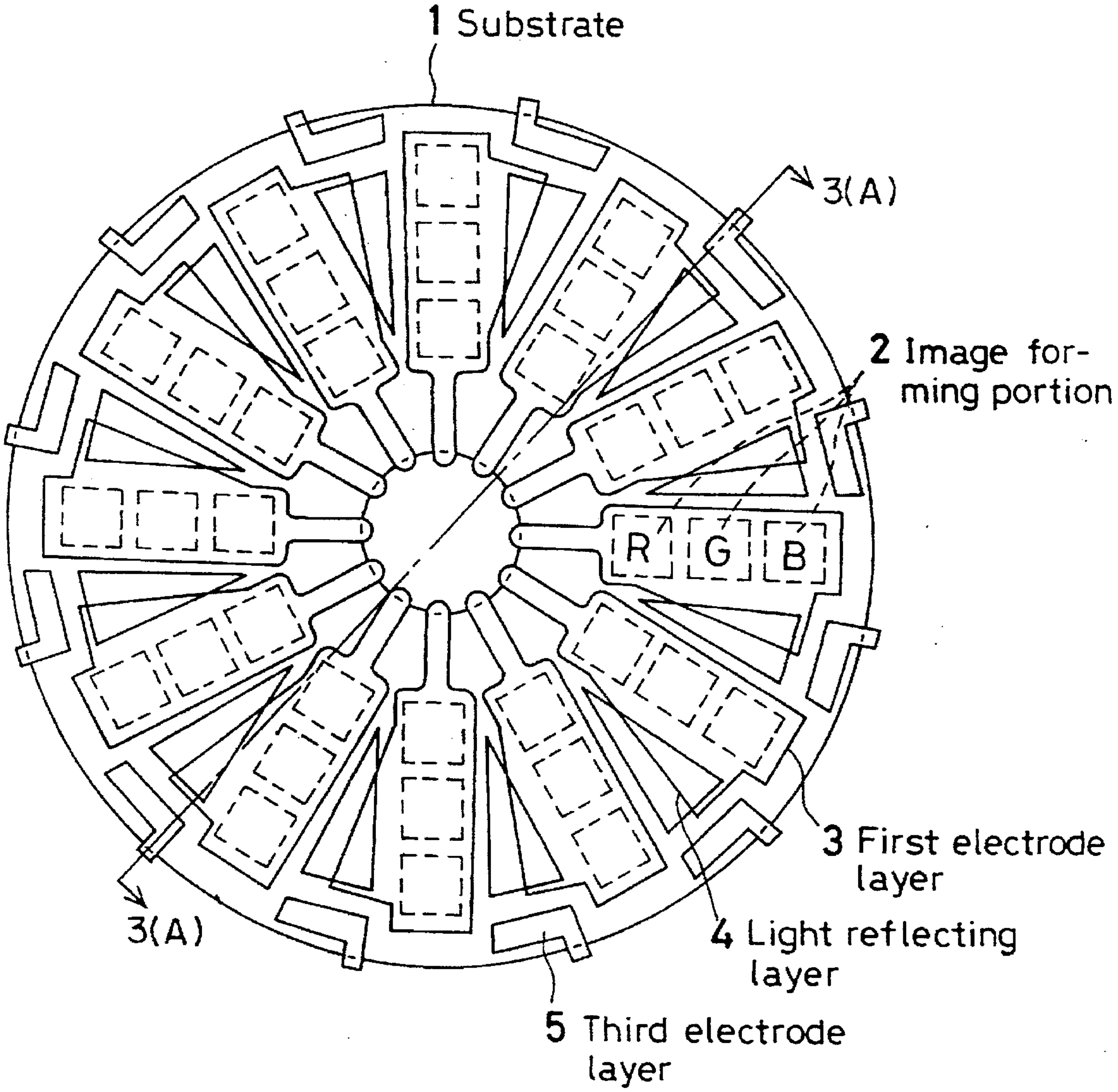
FIG. 1 is a schematic view showing a portion (1) of the construction of an integrated type of information recording system according to the present invention.
Figure 2:
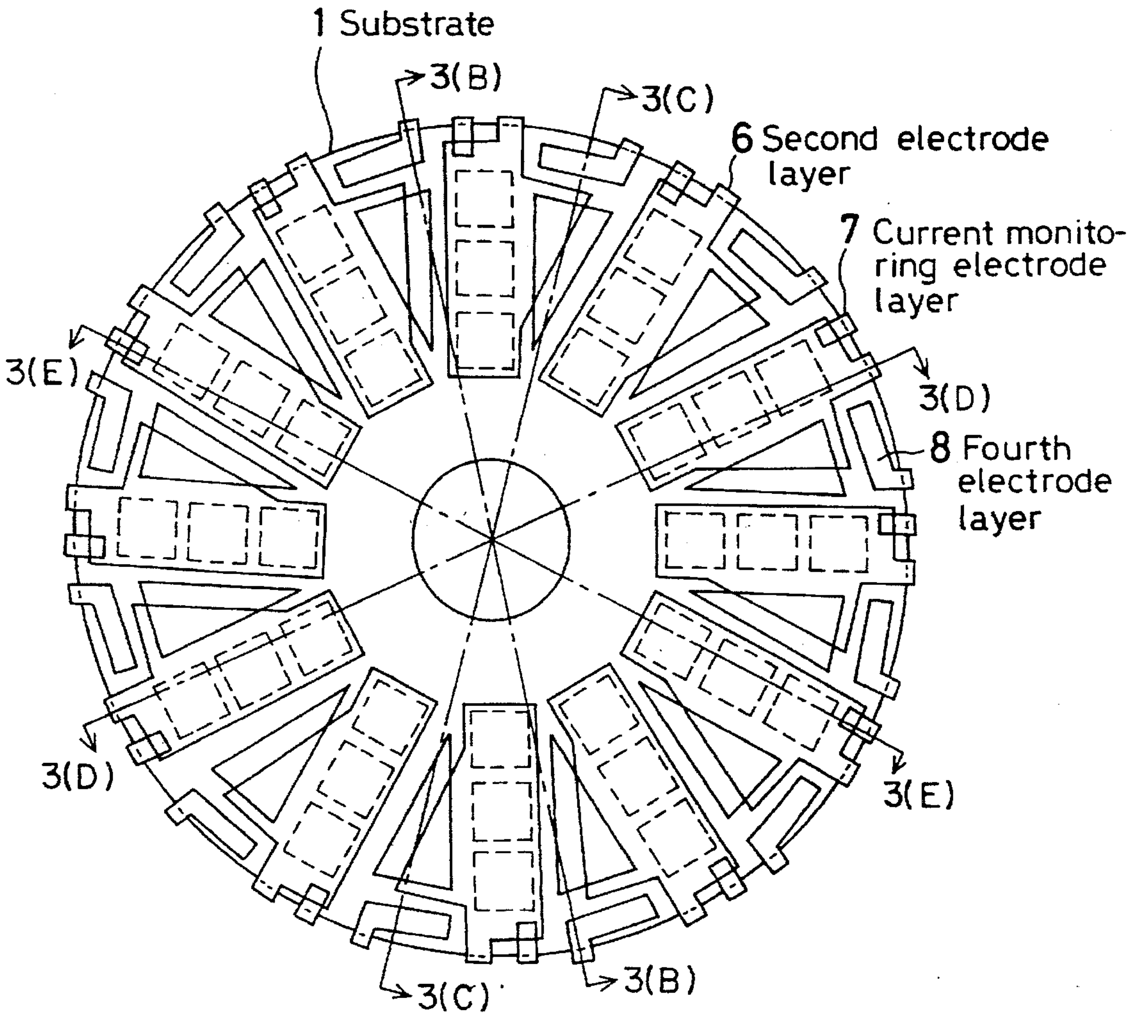
FIG. 2 is a schematic view showing a portion (2) of the construction of an integrated type of information recording system according to the present invention.

FIG. 1 is a schematic view showing the construction (portion 1) of an integrated type of information recording system according to the present invention. Referring to FIG. 1 and FIG. 2, the planar arrangement of parts or elements will be chiefly described. For the layer arrangement or construction, see FIGS. 3 and 9 which will be explained later.

Referring now to FIG. 1, reference numeral 1 represents a substrate formed of such material as glass or plastics, is in disk form, and is centrally provided with a hole. Reference numeral 2 represents an image forming portion including three image regions of the three primary colors R, G and B, and a plurality of such portions 2 are arranged radially around the central hole in the substrate 1. Reference numeral 3 stands for a first electrode layer provided on a liquid crystal layer of the image forming portion 2, and having a terminal guided in the central hole in the substrate 1.

A light reflecting layer, 4 serves to monitor the transmittance of the liquid crystal layer and is positioned between the liquid crystal layer and a photo-conductive layer and provided on the surface of either one thereof. A second electrode layer is opposed through the photoconductive layer to the light reflecting layer 4. Reference numeral 5 stands for a third electrode layer provided on a region of the liquid crystal layer which is used to record pieces of information such as address and image capturing information except image information, and having a terminal guided to an outer periphery of the substrate 1.

FIG. 2 is a schematic view showing the construction (portion 2) of an integrated type of information recording system according to the present invention. Referring to FIG. 2, a second electrode layer shown at 6 is provided on a region of the substrate 1 corresponding to the image forming portion 2 and light reflecting layer 4, and has a terminal guided to an outer periphery of the substrate 1. A current monitoring electrode shown at 7 is provided for the purpose of monitoring a dark current through the photoconductive layer, a recording current value of the darkest portion in a recorded image, etc. A fourth electrode layer shown at 8 is located below a region for recording pieces of information such as address information and image capturing information other than image information, and has a terminal guided to an outer periphery of the substrate 1.

The address information is position information on the substrate of the integrated type of information recording system on which an image is taken or has been taken. Before the image is taken or whenever the image is taken, the address information is written on the recording system to enable an unrecorded region to be retrieved or inform the user of the number of the remaining recordable regions.

The image capturing information is information about the date, time and place at which an image is taken, and incidental comments and sounds, serves to identify the image taken, and includes various pieces of additional information.

Figure 3A:
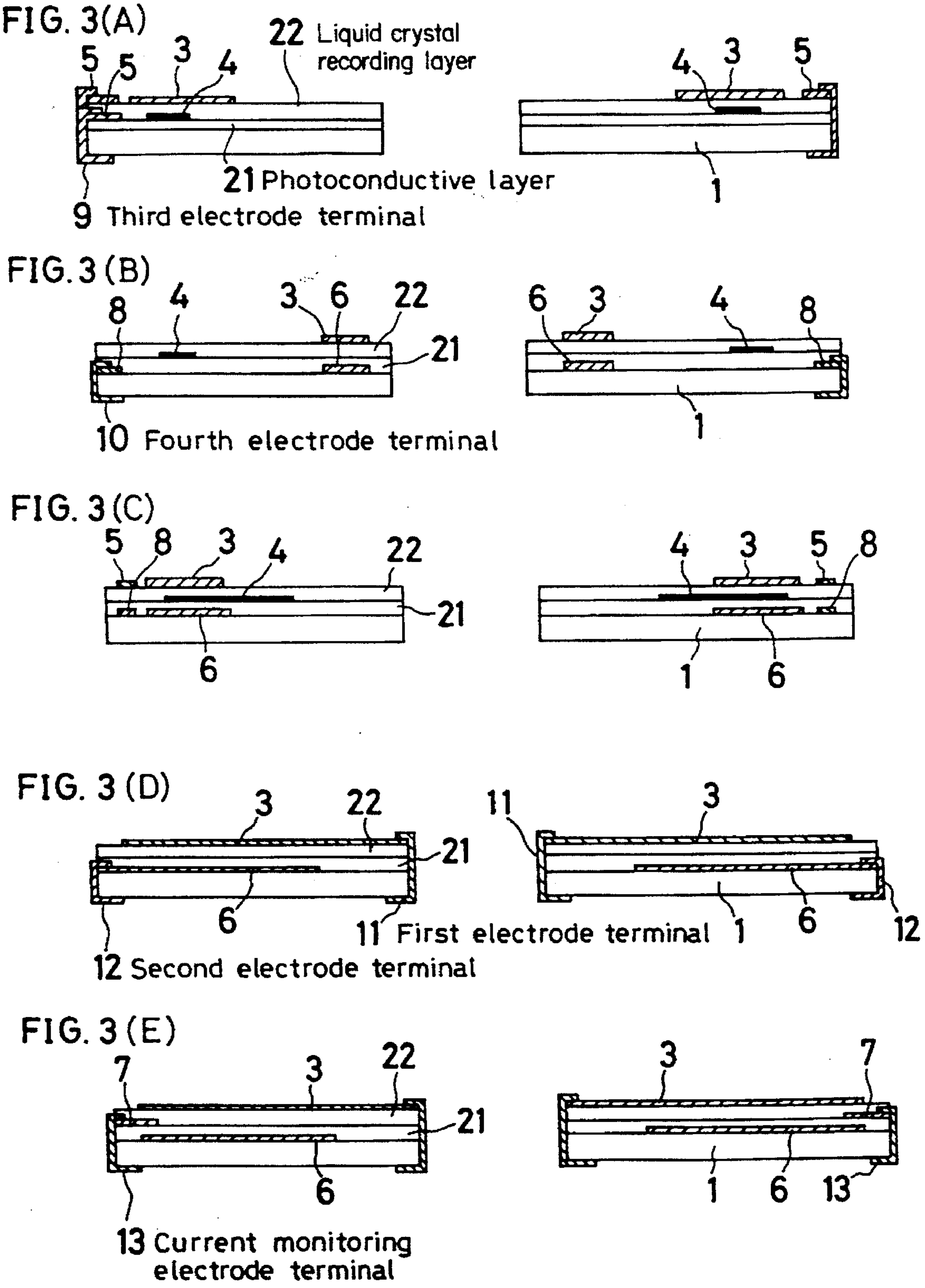

FIG. 3 is sectional views of an integrated type of information recording system according to the present invention. FIG. 3(A) is taken along the line AA' in FIG. 1, FIG. 3(B) along the line BB' in FIG. 2, FIG. 3(C) along the line CC' in FIG. 2, FIG. 3(D) along the line DD' in FIG. 2, and FIG. 3(E) along the line EE' in FIG. 2.

As illustrated in FIG. 3(A), the third electrode layer 5 has a third electrode terminal 9 extending along the peripheral edge of the substrate and terminating at the back side of the substrate. The light reflecting layer 4 is located between a liquid crystal recording layer 22 and a photoconductive layer 21.

As illustrated in FIG. 3(B), the fourth electrode layer 8 has a fourth electrode terminal 10 extending along the peripheral edge of the substrate and terminating at the back side of the substrate.

As illustrated in FIG. 3(C), the third electrode layer 5 is formed on the liquid crystal recording layer 22, and the fourth electrode layer 8 is formed between the substrate 1 and the photoconductive layer 21.

As illustrated in FIG. 3(D), the first electrode layer 3 has a first electrode terminal 11 extending along the hole in the substrate and terminating at the back side of the substrate. The second electrode layer 6 has a second electrode terminal 12 extending along the peripheral edge of the substrate and terminating at the back side of the substrate.

As illustrated in FIG. 3(E), the current monitoring electrode layer 7 is formed between the liquid crystal recording layer 22 and the photoconductive layer 21.

Figure 4:
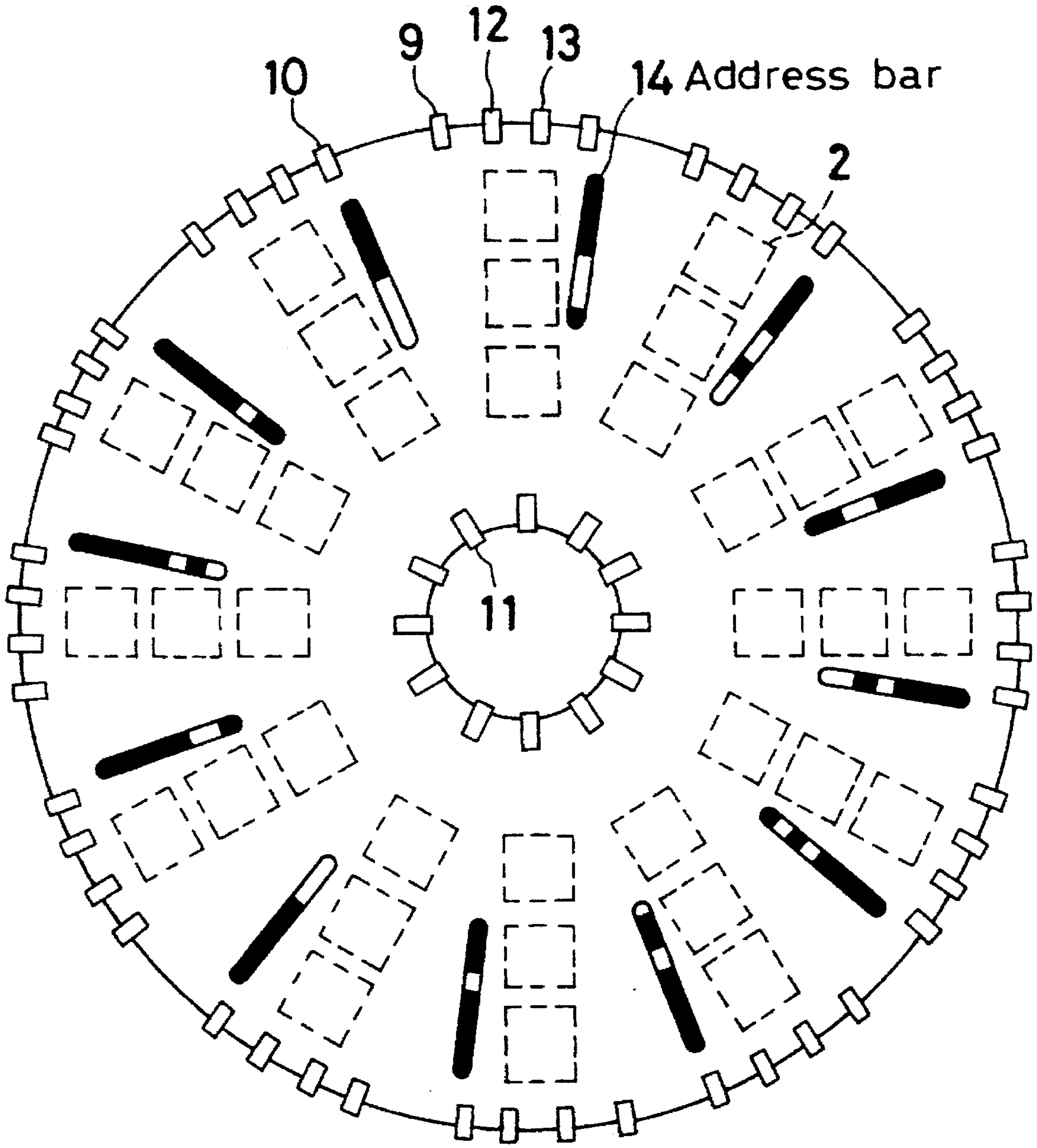
FIGS. 4(A)–4(B) are schematic views showing the back surface of the substrate of an integrated type of information recording system according to the present invention and address bars arranged thereon.
Figure 4:
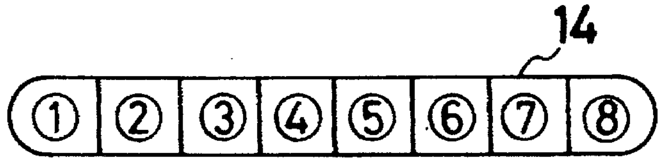

FIG. 4 is schematic views showing the back surface of the substrate 1 of an integrated type of information recording system according to the present invention and an arrangement of address bars provided thereon. Referring to FIG. 4(A) that illustrates the entire back surface of the substrate 1, each address bar shown at 14 serves as a locating mark when a round disk form of recording information system is rotated around the hole and stopped, and includes address information.

FIG. 4(B) is a schematic view showing one example of the construction of the address bar 14 (in the case where up to 16 sets of image forming portions are used). As illustrated in FIG. 4(B), the address bar 14 is composed of eight element portions (1) to (8) (which correspond to 1-byte information). In the example shown in FIG. 4(A), (1) to (4) are assigned to the address information (4 bits) while (5) to (8) are allocated to the locating mark (4 bits). The given information is expressed by "0" and "1", and is imparted to the element portions (1) to (8) in pattern form. For instance, "0" and "1" may be discriminated by differences in the reflectivity of light, color, interference, etc.

It is here noted that in addition to the optical pattern, a magnetic recording pattern may be provided by the provision of a magnetic recording layer.

It is also noted that the number of element portions defining the address bar is not always limited to eight; the required number of element portions may be provided in correspondence to the number of sets of image forming portions.

Figure 5:
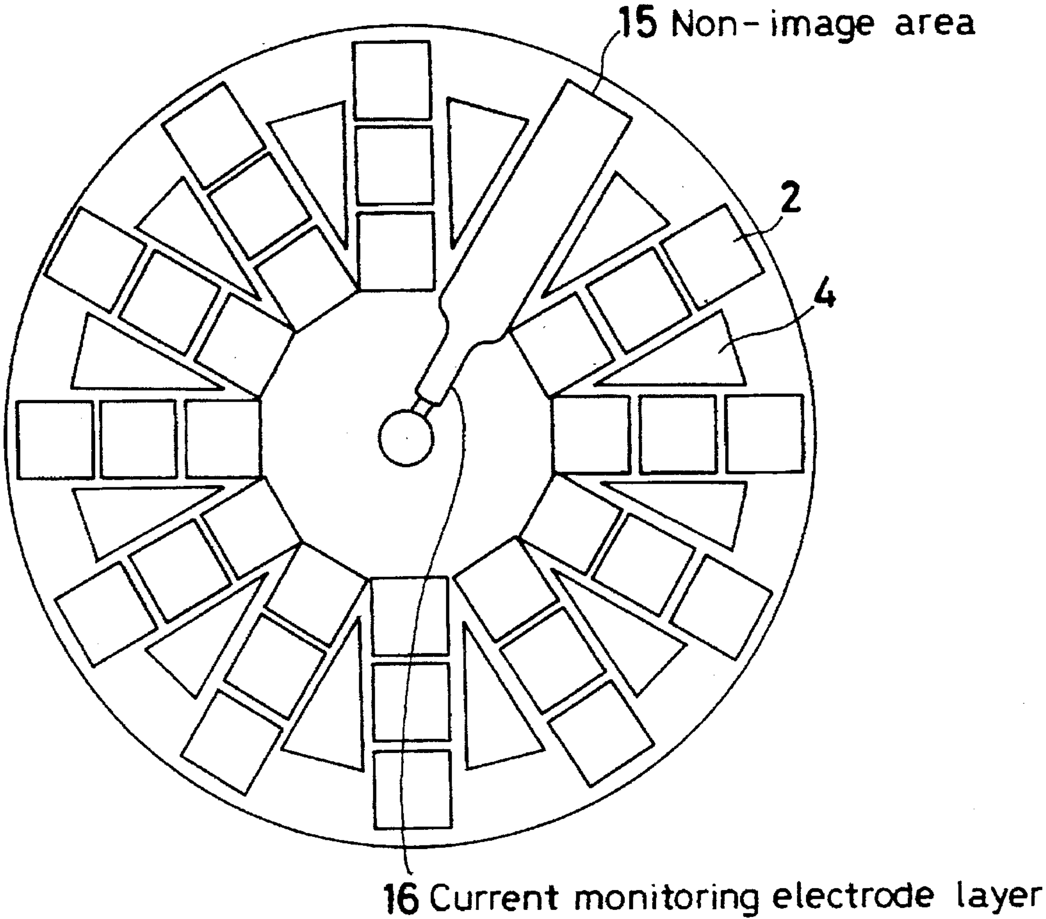
FIGS. 5(A)–5(C) are schematic views showing another embodiment of the present invention.
Figure 5:
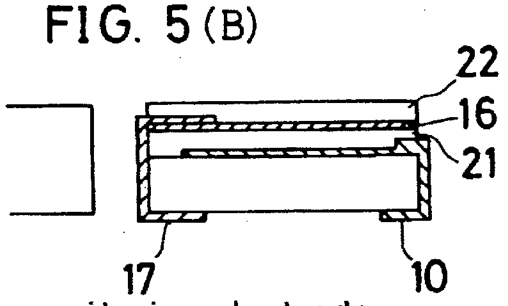
Figure 5:
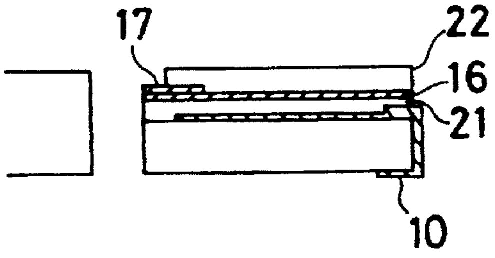

FIG. 5 illustrates another embodiment of the present invention. In this embodiment as shown in FIG. 5(A), a part of the image forming portion is formed as a monitoring region with no upper electrode layer (first electrode layer) provided thereon, which then serves as a current monitoring electrode layer 16. As illustrated in FIG. 5(B), this current monitoring electrode layer 16 is extended down through the central hole to define a current monitoring electrode terminal 17.

In this embodiment, some region is formed as the current monitoring electrode layer 16 while no upper electrode layer is provided thereon. Since this electrode layer is extended up or down through the central hole to define the current monitoring electrode terminal 17, it is possible to avoid its conductive connection with the electrode terminal (second electrode terminal) of the lower electrode layer.

In an embodiment shown in FIG. 5(C), on the other hand, the inner diameter of the liquid crystal recording layer 22 is made larger than the inner diameter of the hole in the substrate to define a contact 17 on the surface of the disk.

FIG. 6 illustrates an embodiment in which an integrated type of information recording system in disk form is packaged in a rectangular packaging case. In FIG. 6, the integrated type of information recording system is rotatably received in the case. This case, here shown at 18, has a horizontally movable shutter 19, so that front and back openings 20 and 23, formed partly in the case 18, can be shut up or kept open.

Figure 6A:
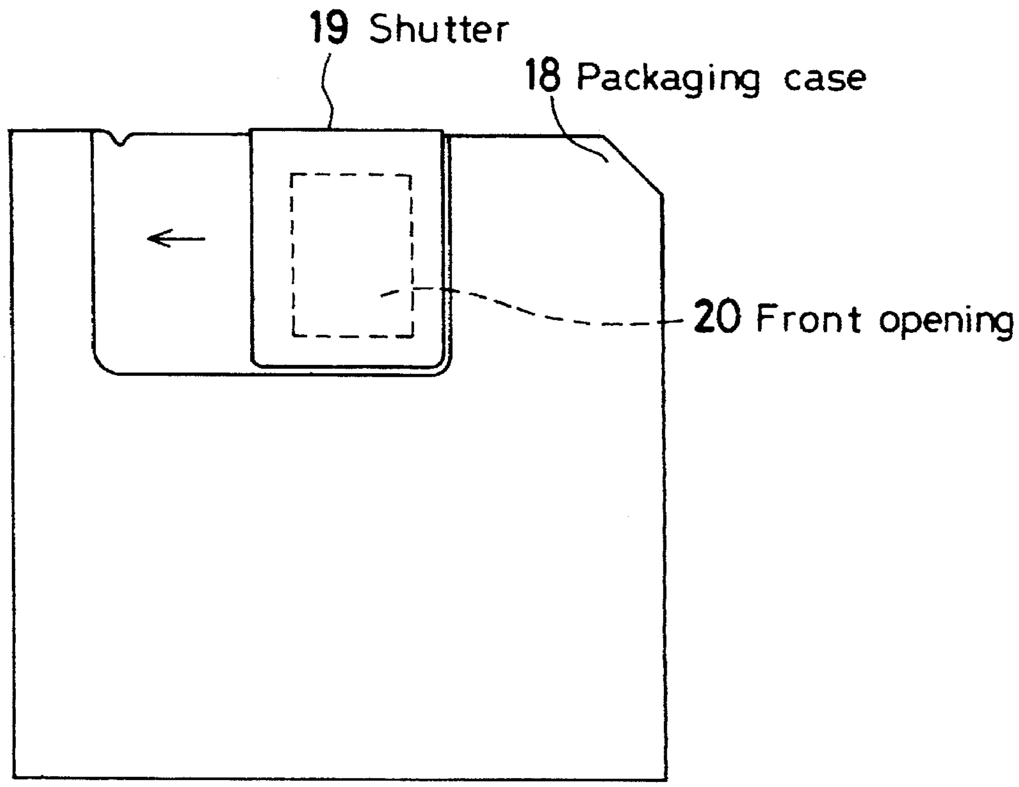
FIGS. 6(A) and 6(B) are schematic views showing an embodiment where an integrated type of information recording system in disk form is packaged in a rectangular case.
Figure 6B:
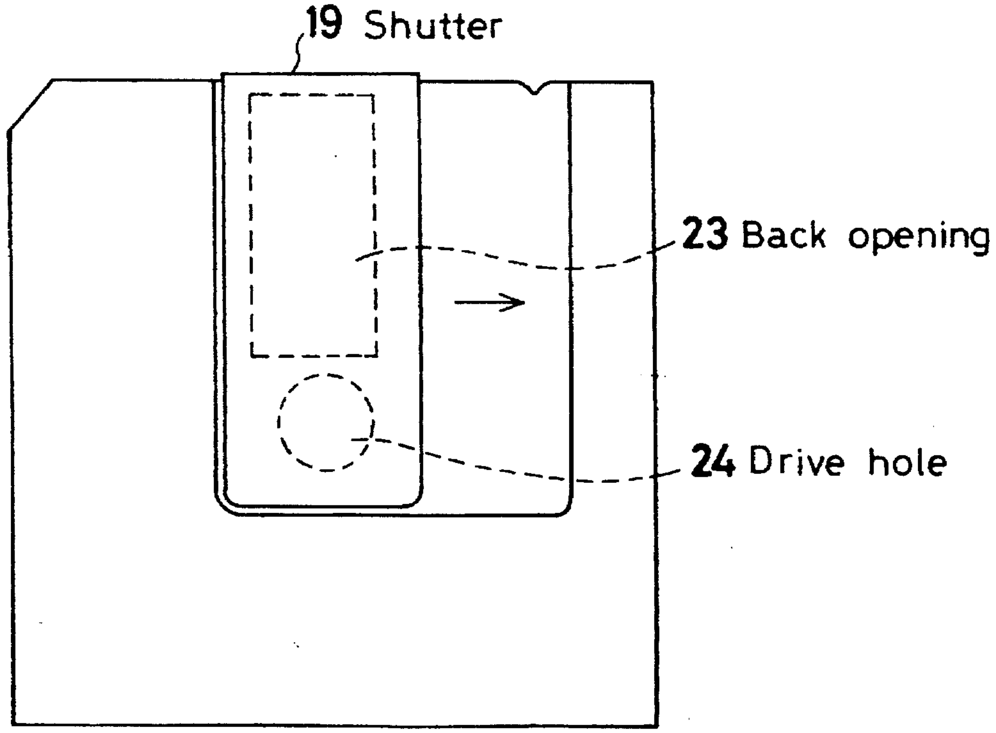

In this embodiment, the recording system is received in the case 18 with the front side shown in FIG. 6(A) defining the photoelectric sensor side and the back side shown in FIG. 6(B) defining the liquid crystal layer side. When the case 18 is loaded in a camera, the shutter 19 is moved in the direction shown by an arrow. Thus, information can externally be recorded on, or reproduced from, the image forming portions, the address information recording portions, the image capturing information recording portions, etc., through both the front and back openings 20 and 23. Especially because the back opening is of large size, it is possible to obtain electrical contacts through which the electrode terminals of the image forming, address information recording, image capturing information recording and current monitoring portions can be connected to external equipment.

The back side portion of the shutter 19 is also such that a drive hole 24 for driving or stopping the rotation of the integrated type of information recording system in disk form can be shut up or kept open.

To reproduce the information, the shutter 19 is moved to expose the image forming portions to view, so that the information can be read out of the back side of the system that defines the liquid crystal layer by means of an image pickup sensor such as a CCD line sensor.

Figure 7A:
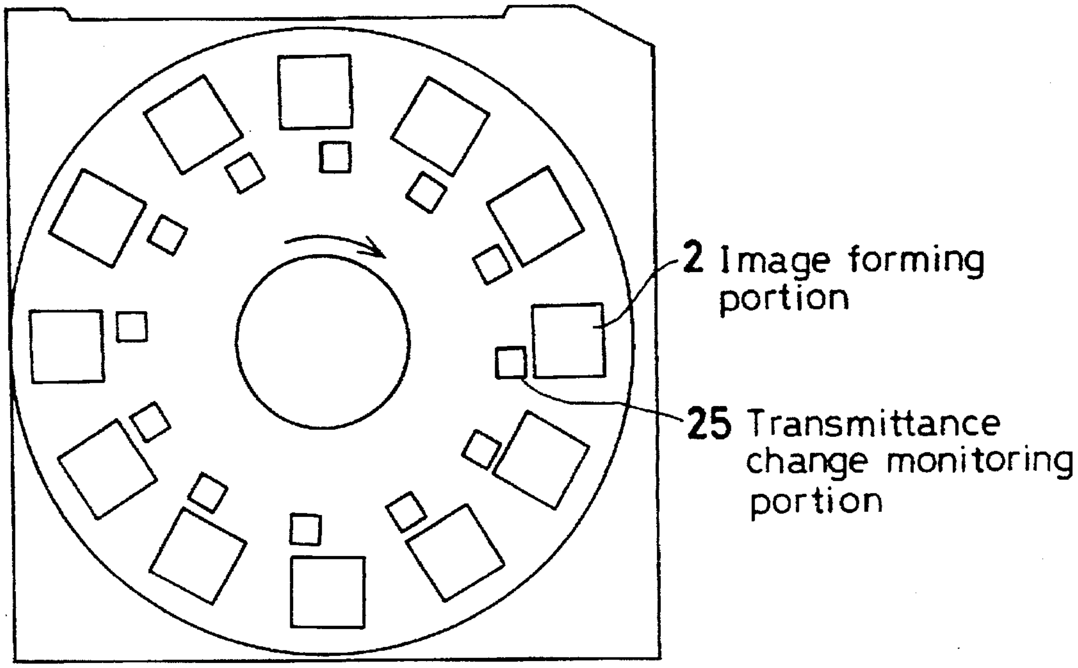
FIGS. 7(A) and 7(B) are schematic views showing the internal structure of an integrated type of information recording system in disk form, which is packaged and received in a case.
Figure 7B:
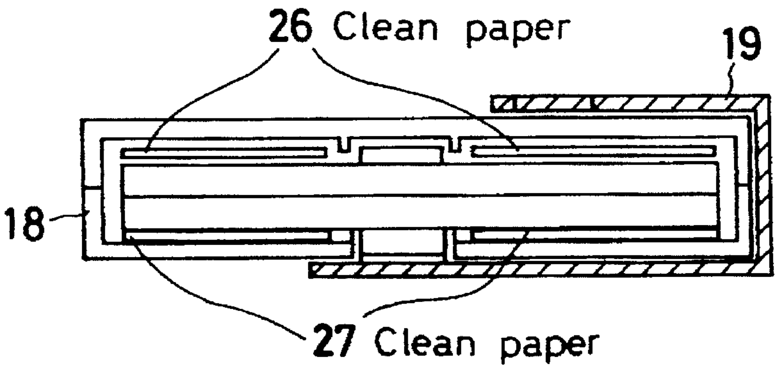

FIG. 7 illustrates the internal construction of an integrated type of information recording system in disk form, which is packaged and received in a packaging case. FIG. 7(A) shows the front surface side thereof while FIG. 7(B) shows a section thereof. Referring here to FIG. 7(A), a plurality of image forming portions 24 are radially provided on a disk form of substrate. For each image forming portion 24, a transmittance change monitor 25 is provided, so that control of image capturing conditions can be done by the measurement of transmittance.

As shown in FIG. 7(B), clean papers 26 and 27 are preferably provided on both inner surfaces of a case 18 while they are opposed to the recording system, thereby preventing contamination of the recording system with dust, etc. More preferably, other dust-proof and moisture proof means should also be taken, because the information recording layer is sensitive to dust and moisture.

In equipment for recording and reproducing information on and from such a packaged recording system, image writing light is incident on the front surface side thereof on which the photoelectric sensor is located, and this is common to both the transmission type of liquid crystal recording medium and the reflection type of liquid crystal recording medium. Reading light is incident on the front or back surface thereof in the case of the transmission type, and on the liquid crystal side thereof in the case of the reflection type wherein the reflecting layer is formed on the interlayer. Where the upper electrode layer (the electrode on the liquid crystal layer) serves as a reflection layer, both writing light and reading light are incident from the front surface (photoelectric sensor) side.

An account will now be given of how to fabricate a round disk with reference to FIG. 8 showing a process of fabricating and shaping the round disk.

Figure 8A:
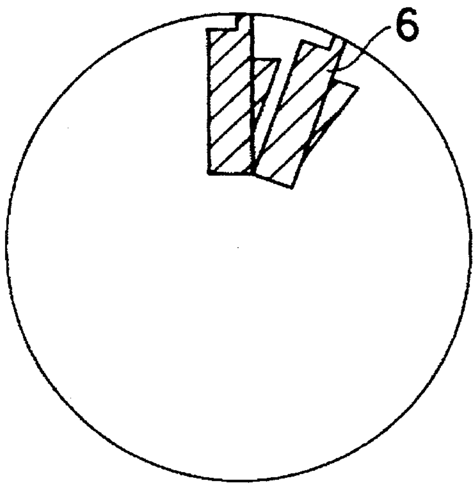
FIGS. 8(A)–8(E) are schematic views showing a process of fabricating and shaping a disk form of substrate.

Referring first to FIG. 8(A), an ITO (indium tin oxide) coating film is formed on a round substrate made of glass, plastics or the like, and then patterned to form a lower electrode layer (a second electrode layer 6). This patterning may be carried out by etching, using a resist, a dry mask, etc. In this case, while the lower electrode layer may be overall formed of the same material, it is understood that it may be partly formed of metal such as Au or Al.

In particular, an electrode terminal is made of material different from that of the electrode layer. The lower electrode terminal, when it is in a thin film form of conductive material, may be formed by ion plating, sputtering, evaporation, CVD, etc., and when it is in a thick film form of conductive material, may be formed by the printing of silver paste, the soldering or spot welding of indium, etc.

After the lower electrode has been uniformly patterned in a round disk form, a photoconductive layer is formed by coating processes such as spinner coating, blade coating, and dip spraying. This photoconductive layer is uniformly formed all over the surface of the round substrate including the patterned lower electrode portion.

Figure 8B:
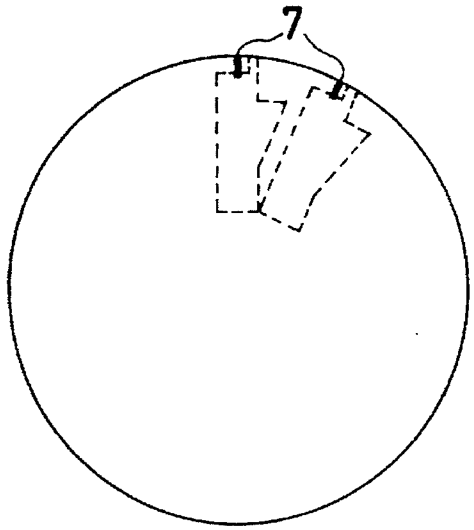

Then, as shown in FIG. 8(B), a current monitoring electrode 7 is stacked on, and extended along, the edge of the round substrate while it overlaps the lower electrode with the photoconductive layer formed thereon. This stacking operation may be carried out using a dry mask, etc. Subsequently, a transparent interlayer is stacked on the electrode 7, and then provided thereon with a transmittance monitoring reflection layer 4, as shown in FIG. 8(C).

It is here noted that the interlayer may be formed by stacking aqueous resin or gelatin on the electrode 7 by spinner coating, blade coating, dip spraying or the like. Alternatively, the interlayer may be formed by stacking an inorganic insulating layer ($SiO_2$, $Al_2O_3$, ZnS, etc.) on the electrode 7 by evaporation, sputtering, ion plating, CVD or the like. The transmittance monitoring reflection layer may be formed by the evaporation, sputtering, ion plating, and other processing of Au, Al, etc.

Figure 8C:
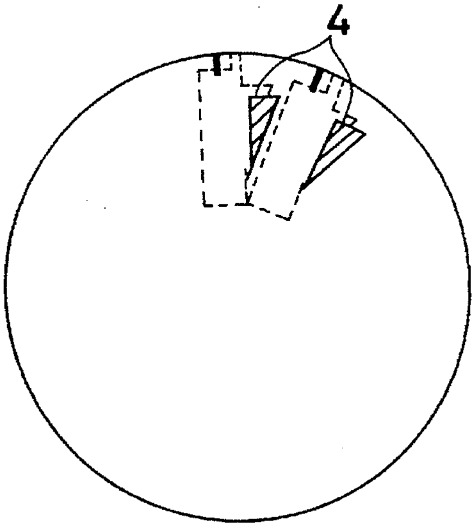

As shown in FIG. 8(C), a liquid crystal recording layer is stacked on the transmittance monitoring reflection layer which has been stacked on the interlayer.

Figure 8D:
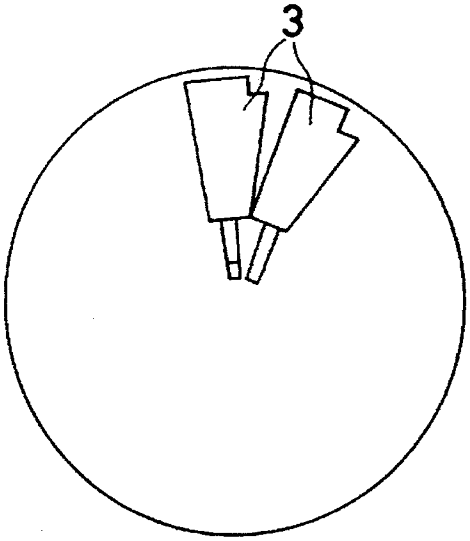
Figure 8E:
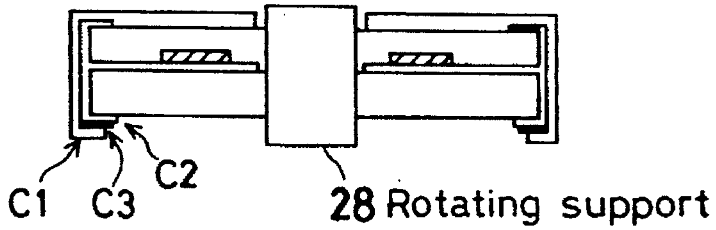

Then, as shown in FIG. 8(D), an upper electrode (a first electrode layer 3) is patterned using a dry mask, etc., and extended to a peripheral edge of the round disk. The thus obtained round disk is received in a packaging case as shown in FIG. 6, which is then loaded in a camera, etc., to realize a recording system. More specifically, as shown in FIG. 8(E), the recording system is rotatably supported by a rotating support 28 of a device such as a camera. In this case, the upper electrode terminal, lower electrode terminal, current monitoring electrode terminal, and address information recording terminal are taken out of the back side of the round substrate.

PHOTOELECTRIC SENSOR & INFORMATION RECORDING MEDIUM

Reference will now be made to the photoelectric sensor and information recording medium used in the present invention.

Figure 9A:
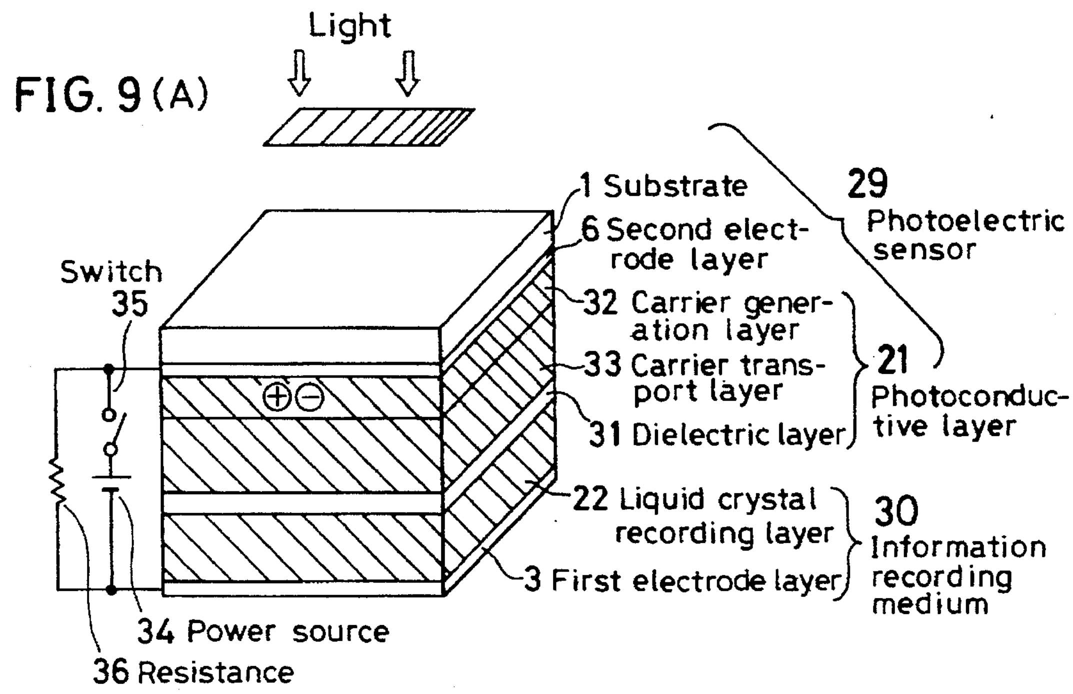
FIGS. 9(A) and 9(B) are schematic views showing the construction of a packaged type of information recording system according to the present invention, in which a photoelectric sensor and an information recording medium are stacked on each other while they are brought in close contact with each other.

Referring to FIG. 9(A), photoelectric sensor here shown at 29 and an information recording medium here shown at 30 are stacked on each other, and voltage is applied on the surfaces of respective components of these media.

Figure 9B:
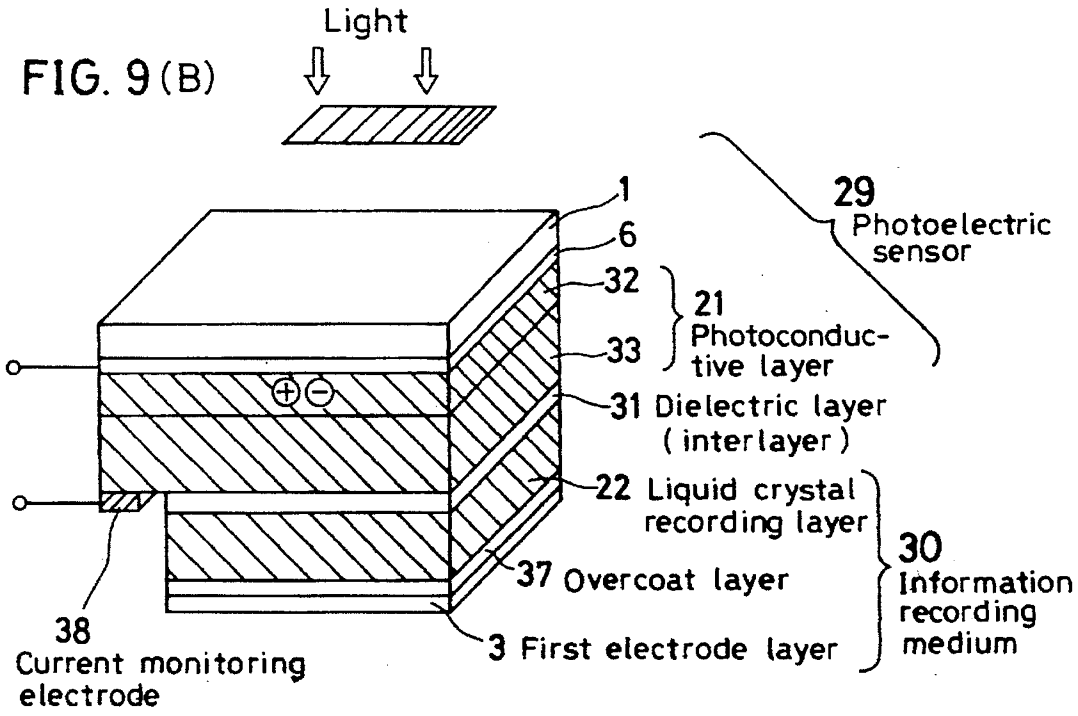

In a packaged type of information recording system according to the present invention, as schematically shown in FIG. 9, the photoelectric sensor 29 and information recording medium 30, both of planar shape, are stacked on each other while they are brought into close contact with each other. In FIG. 9, reference numeral 31 indicates a dielectric layer (interlayer) which is to be used when the sensor and recording medium are stacked on each other. In FIG. 9(A), no overcoat layer 37 is used but the direction of the voltage applied is shown. In FIG. 9(B), on the other hand, the overcoat layer 37 is used, and the construction of a current monitoring electrode 38 is illustrated as well. Materials, constructions, actions, etc., of the overcoat layer 37 and other layers will be described later.

In the present invention, the photoconductive layer of the photoelectric sensor may be formed of either a single layer or a plurality of layers. Here, however, a laminated type of photoelectric sensor will be explained.

In FIG. 9, reference numerals 1, 6 and 21 stand for a substrate, a second electrode layer and a photoconductive layer, respectively. The photoconductive layer 21 is made up of a carrier generation layer 32 and a carrier transport layer 33. Thus, the photoelectric sensor 29 is made up of the substrate 1, second electrode layer 6, carrier generation layer 32 and carrier transport layer 33.

An information recording medium, on the other hand, is made up of a first electrode layer 3, a liquid crystal recording layer 22 and optionally includes an overcoat layer 37.

The arrangement shown in FIG. 9 operates as follows. Upon a shutter being opened by a control circuit, the light coming from a subject through a lens reaches an optical system for three-color separation, where it is separated to three colors (red, green, and blue), although not shown. The image of the subject transmits through the substrate 1 and the second electrode layer 6, and is formed on the surface of the photo-conductive layer 21.

The photoconductive layer 21 manifests conductivity depending on the quantity of light of each portion of the formed image. In other words, the image of light is converted to a conductive image.

Voltage is applied across the first and second electrode layers 3 and 6 by a voltage applying means. At a power source 34, one electrode terminal is grounded, and this grounded terminal is connected to the first electrode layer 3 of the information recording medium 30. Another electrode terminal is connected to the second electrode layer 6 of the photoelectric sensor 29 via a switch 35 put on or off by a control circuit in a controlled manner. A resistance 36 is connected between the first and second electrode layers 3 and 6. With the switch 35 held open, there is thus no potential difference between both electrodes because charges built up therebetween are discharged through the resistance 36.

Upon the switch 35 closed for the application of given voltage while the above-mentioned image of light is converted into a conductive image, a current flows through the photoconductive layer 21 depending on its conductivity. This current will hereinafter be called the photo-induced current. One characteristic feature of the photoconductive layer according to the present invention is that it has a considerable effect on the amplification of the photo-induced current.

By this photo-induced current the liquid crystal recording layer is so oriented that it changes from a light scattering body to a light transmitting body. Upon the application of voltage interrupted by the control circuit after given voltage has been applied for a given time, the liquid crystal recording layer 22 remains oriented due to its memory function. In other words, the formed image is recorded in the form of a difference of the liquid crystal recording layer 22 in the light scattering state.

CONSTRUCTION & MATERIAL OF THE PHOTOELECTRIC SENSOR

A detailed account will now be given of the construction and material of the photoelectric sensor used The he present invention.

The carrier generation layer 32 of the photoelectric sensor is composed of a carrier generation substance and a binder.

For the carrier generation substance, dyes and pigments such as pyrylium dyes, azulenium pigments, squarilium salt dyes, phthalocyanine pigments, perylene pigments, polycyclic quinone pigments, indigo pigments, pyrrole pigments, and azo pigments may be used alone or in combination of two or more.

For the binder, resins such as polycarbonate resin, vinyl formal resin, vinyl acetal resin, vinyl butyral resin, polyester resin, acrylic resin, methacrylic resin, vinyl chloride resin, vinyl acetate resin, and vinyl chloride-vinyl acetate copolymer resin may be used alone or in combination of two or more.

Referring here to the ratio at which the carrier generation substance is mixed with the binder, 0.1 to 10 parts by weight, preferably 0.2 to 1 part by weight of the binder should be used per part by weight of the carrier generation substance. The carrier generation layer should have a thickness of 0.01 to 1 μm, preferably 0.1 to 0.5 μm, as measured upon drying. Such thicknesses ensure good-enough sensitivity and image quality.

The above-mentioned carrier generation substances, if they can be evaporated, may immediately be formed into film without recourse to any binder.

The carrier transport layer 33 is composed of a carrier transport substance and a binder.

The carrier transport substance is one excelling in the ability to transport carriers generated by the carrier generation layer. Exemplary mention is made of oxazole compounds, thiazole compounds, triphenylmethane compounds, styryl compounds, stilbene compounds, hydrazone compounds, carbazole compounds, amine compounds, aromatic amine compounds, triphenylamine compounds, butadiene compounds, polycyclic aromatic compounds, and biphenyl compounds, with the proviso that they are excellent in the ability to transport holes.

For the binder, styrene resin, styrene-butadiene copolymer resin, polyacrylate resin, and phenoxy resin may be used in addition to those mentioned in connection with the above-described carrier generation layer. However, preference is given to styrene, styrene-butadiene copolymer resin, and polycarbonate resin. It is desired that the binder be used in an amount of 0.1 to 10 parts by weight, preferably 0.1 to 1 part by weight per part by weight of the carrier transport substance. The carrier transport layer should have a thickness of 1 to 50 μm, preferably 3 to 26 μm, as measured upon drying. Such thicknesses ensure good-enough sensitivity and image quality.

The second electrode layer 6 must be transparent if the information recording medium is opaque. If the information recording medium is transparent, however, it may be either transparent or opaque. For this layer, materials capable of having a resistivity of at least $10^6$ Ω·cm in a stable manner, for instance, a conductive thin film of metal such as gold, platinum, zinc, titanium, copper, iron, and tin, a conductive film of metal oxide such as tin oxide, indium oxide, zinc oxide, titanium oxide, tungsten oxide, and vanadium oxide, a conductive film of organic material such as quaternary ammonium salt may be used alone or in combination of two or more. Preferable among these is an oxide conductor, especially indium tin oxide (ITO).

The second electrode layer 6 may be formed by techniques such as sputtering, CVD, coating, plating, dipping, and electrolytic polymerization. It is here noted that the thickness thereof must be varied depending on the electrical characteristics of the material of which the electrode is formed, and the voltage applied for recording information. For instance, an ITO film should have a thickness of about 10 nm to about 300 nm, and be formed all over the surface of the photoconductive layer or in any desired pattern. The second electrode layer 6 may also be formed by the lamination of two or more materials.

The substrate 1 must be transparent if the information recording medium to be described later is opaque. If the information recording medium is transparent, however, the substrate 1 may be either transparent or opaque. The substrate may be in card, film, tape, disk or other forms, and have strength enough to support the photoelectric sensor. For instance, use may be made of flexible plastic films, or rigid members such as glass sheets or cards, and plastic sheets or cards formed of polyethylene, polypropylene, polyethylene terephthalate, polymethyl methacrylate, polymethyl acrylate, polyester, and polycarbonate.

This solution was then coated on the electrode at 1,400 rpm for 0.4 seconds by means of a spinner in the case of the glass substrate, or by means of a dip coating technique in the case of the film substrate.

Formula (1)

Carrier Generation Substance

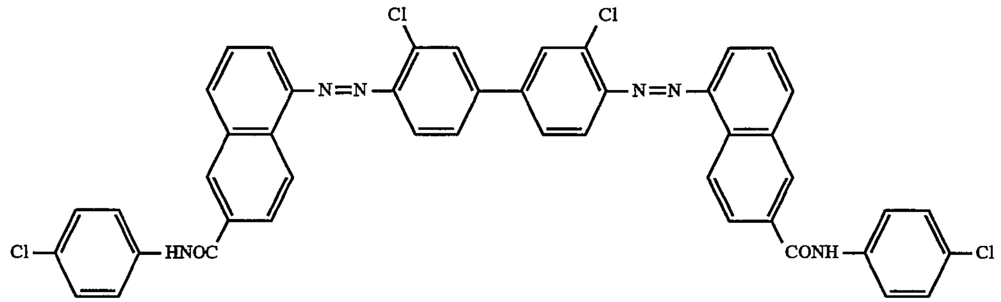

It is preferable that the substrate has an antireflection effect. To this end, a layer having an anti-reflection effect is stacked on the side of the substrate opposite to that on which the electrode is provided, if the electrode is transparent. Alternatively, the transparent substrate may be regulated to a thickness at which the anti-reflection effect is achievable. These antireflection means may also be used in combination.

The photoconductive layer may further contain electron acceptors, sensitizing dyes, antioxidants, UV absorbers, light stabilizers, etc. Electron acceptors and sensitizing dyes are effective for the control and stabilization of base currents, sensitization, etc. These additives are used in an amount of 0.001 to 10 parts by weight, preferably 0.01 to 1 part by weight per part by weight of the photoconductive substance. At less than 0.001 part by weight they are ineffective while at more than 10 parts by weight they have an adverse influence on image quality.

The foregoing is the detailed explanation of the construction and material of the photoelectric sensor according to the present invention.

FABRICATION OF THE LAMINATED TYPE PHOTOELECTRIC SENSOR

Reference will now be made to how to fabricate the laminated type photoelectric sensor.

An ITO film having an area resistance of 80 Ω/□ and a thickness of 100 nm was formed by sputtering on a well washed glass substrate of 1.1 mm in thickness or a well washed film substrate of 100 μm in thickness, thereby obtaining an electrode.

Using a scriber cleaner ("Plate Cleaner", Model 602, manufactured by Ultratech Co., Ltd.), the electrode was twice subjected to a cleaning cycle comprising a two-second injection of pure water, a 20-second scriber cleaning, a 15-second rinsing with pure water, a 25-second removal of moisture, and a 55-second infrared drying.

Three (3) parts by weight of a carrier generation substance, viz., a bis-azo pigment having the following structural formula (1) and 1 part by weight of a mixed vinyl chloride-vinyl acetate resin (a 75:25 mixture of "Denka Vinyl #1000 D" made by Denki Kagaku Kogyo K.K. and "18, 325.89J cyclohexanone to prepare a coating solution.

Thereafter, the thus coated glass or film substrate was leveled and dried under dust-free conditions until the coated surface showed no sign of deposition due to the presence of a skin thereon. Following this, the substrate was dried at 100° C. for 1 hour to obtain a carrier generation layer of 300 nm in thickness thereon.

Fifty (50) parts by weight of a carrier transport substance, viz., a butadiene derivative having the following structural formula (2) ("T-405" made by Anan Co., Ltd.) and 10 parts by weight of a styrene-butadiene copolymer resin ("Clearen 730L" made by Denki Kagaku Kogyo K.K.) were uniformly dissolved in 68 parts by weight of chlorobenzene and 136 parts by weight of 1,1,2-trichloroethane to prepare a coating solution.

Formula (2)

Carrier Transport Substance

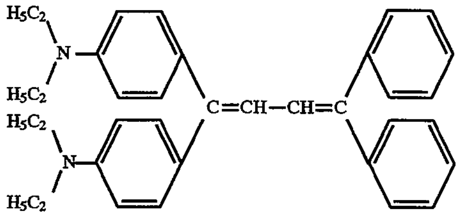

This coating solution was coated on the carrier generation layer at 350 rpm for 0.4 seconds by means of a spinner in the case of the glass substrate, or by means of a dip coating technique in the case of the film substrate. The thus coated substrate was leveled and dried under windless conditions until the coated surface showed no sign of deposition due to the presence of a skin thereon. Following this, the substrate was dried at 80° C. for 2 hours to obtain a carrier transport layer thereon. In this way, a photo-electric sensor according to the present invention, including a photoconductive layer comprising the carrier generation and transport layers and having a thickness of 20 μm, was prepared, and then aged for 3 days in a dark place maintained at room temperature and a relative humidity of up to 60%.

CONSTRUCTION & MATERIAL OF THE INFORMATION RECORDING MEDIUM

Reference will now be made to the construction and material of the information recording medium 30. The information recording medium according to the present invention has an information recording layer comprising a liquid crystal recording layer.

In the liquid crystal recording layer, resin particles are dispersed in the liquid crystal phase. For the liquid crystal material, smectic liquid crystal, nematic liquid crystal, cholesteric liquid crystal, or their mixture may be used. Preferable among these liquid crystals is smectic liquid crystal in view of the so-called memory properties, i.e., the ability to maintain orientation and store information permanently.

Exemplary smectic liquid crystal materials include a liquid crystal material showing a smectic A phase, for instance, a liquid crystal material having a long terminal carbon group such as those based on cyanobiphenyl, cyanoterphenyl, phenyl ester, and fluorine, a liquid crystal material showing a smectic C phase that is used as ferroelectric liquid crystal, or liquid crystal materials showing smectic H, G, E, and F phases.

For the material that forms resin particles, use is preferably made of an ultraviolet-curing resin which is compatible with the liquid crystal material in a monomeric or oligomeric state, or a resin which is compatible with a common solvent for the liquid crystal material in a monomeric or oligomeric state. Exemplary such ultraviolet curing resin includes acrylic ester, and methacrylic ester. Besides, use may be made of a thermosetting resin which is dissolvable in and compatible with a common solvent for the liquid crystal material, for instance, acrylic resin, methacrylic resin, polyester resin, polystyrene resin, and a copolymer composed mainly of these resins, epoxy resin, silicone resin, and the like.

The liquid crystal recording layer should have a liquid crystal content of 10% by weight to 90% by weight, preferably 40% by weight to 80% by weight. The liquid crystal recording layer, when it has a liquid crystal content falling below 10% by weight, will become low in terms of light transmittance even when the liquid crystal phase is oriented by recording information, and when it has a liquid crystal content exceeding 90% by weight, will cause liquid crystals to bleed out or otherwise fail to function normally, resulting in image unevenness.

The thickness of the information recording layer, because of having an influence on resolution, should be 0.1 μm to 10 μm, preferably 3 μm to 8 μm, as measured upon drying. At such thicknesses high resolution can be maintained with a lowering of operating voltage. Too small or large thicknesses are not preferable because the contrast of the information recording portion becomes low in the former case and the operating voltage becomes high in the latter case.

Then, the overcoat layer 37 is explained. As can be seen from FIG. 9(B), the overcoat layer 37 is interposed between the first electrode layer 3 and the liquid crystal recording layer 22. This overcoat layer 37 ensures that the bleeding of liquid crystals out of the surface of the liquid crystal recording layer 22 can be well avoided, and that durability can be imparted to the surface of the information recording medium due to an increase in the hardness thereof.

The overcoat layer 37, for instance, may be formed of a resin such as polyethylene terephthalate resin, polypropylene resin, polyester resin, polystyrene resin, acrylic resin, and methacrylic resin; an ultraviolet-curing resin such as acrylic ester, and methacrylic ester; and a thermosetting resin such as epoxy resin, and silicone resin. A water-soluble resin less compatible with an organic solvent, e.g., polyvinyl alcohol, aqueous polyurethane, water glass, Cytop (Asahi Glass Co., Ltd.) that is a fluorocarbon resin, etc., may also be used to this end.

By use of the ultraviolet-curing resin in particular, it is possible to inhibit the bleeding of liquid crystals out of the surface of the information recording medium, thereby preventing image disorder and a lowering of the conductivity of the electrode layer. It is also possible to impart a very high hardness to the surface of the information recording medium, thereby preventing image disorder due to injury thereto and damage to the information recording medium, and so improving the durability thereof. Moreover, it is possible to avoid any possible image degradation due to the cracking or other defects of the transparent electrode layer laminated on the surface of the information recording medium.

The overcoat layer 37 should have a thickness of 0.1 μm to 20 μm, preferably 0.3 μm to 5 μm, and more preferably 0.5 μm to 2 μm.

The foregoing is the detailed explanation of the construction and material of the information recording medium according to the present invention.

FABRICATION OF THE INFORMATION RECORDING MEDIUM

Reference will now be made to how to fabricate the information recording medium.

The interlayer to be described later was provided on the disk form of photoelectric sensor obtained by the above-mentioned "FABRICATION OF THE LAMINATED TYPE PHOTOELECTRIC SENSOR". Then, 40 parts by weight of a polyfunctional monomer (dipentarythritol hexaacrylate "M-400" made by Toa Gosei Kagaku K.K.), 2 parts by weight of a photo-curing initiator (2-hydroxy-2-methyl-1-phenylpropan-1-one "Durocure 1173" made by Ciba-Geigy AG), 50 parts by weight of liquid crystals (consisting of 90% of smectic liquid crystals ("S-6" made by Merck & Co., Ltd.) and 10% of nematic liquid crystals ("E31LV" made by Merck & Co., Ltd.) and 3 parts by weight of a surface active agent ("Florad FC-430" made by Sumitomo 3M Co., Ltd.) were uniformly dissolved in 96 parts by weight of xylene to obtain a coating solution. This coating solution was then coated on the interlayer using a blade coater having a blade gap of 50 μm. Subsequently, drying was done at 47° C. for 3 minutes and then at 47° C. for 2 minutes under reduced pressure, immediately after which the coated film was irradiated with infrared rays of 0.3 J/cm$^2$ for curing. In this way, an information recording medium including a liquid crystal recording layer of 6 μm in thickness was obtained.

A section of the liquid crystal recording layer was extracted with hot methanol, and dried. An observation of the internal structure of the section under a scanning electron microscope of 1,000 magnifications ("S-800" made by Hitachi, Ltd.) indicated that the layer is covered on the surface with the ultraviolet cured resin of 0.6 μm in thickness and contains therein a continuous liquid crystal phase with a resin particle phase of 0.1 μm in diameter filled in it.

CONSTRUCTION AND MATERIAL OF THE INTEGRAL TYPE INTERLAYER

In the integrated type of information recording system, the photoelectric sensor and the information recording medium are directly stacked on each other while they are opposed to each other through a dielectric layer 31. This arrangement using the dielectric layer 31 is particularly suitable for the photoelectric sensor in which the photoconductive layer is formed using a solvent. By forming the information recording layer on the photoconductive layer by direct coating, it is possible to avoid image unevenness through their interaction, which may otherwise be caused by the bleeding of liquid crystals out of the information recording layer or by the dissolution of the photoconductive material in the solvent for forming the information recording layer. It is also possible to construct the photoelectric sensor and the information recording medium as one piece.

When the dielectric layer 31 is formed, it should be insoluble in both the materials for forming the photoconductive layer and information recording layer. The dielectric layer 31 should have some insulating properties, because resolution decreases due to the diffusion of spatial charges. It is desired that the dielectric layer be as thin as possible; preferably less than 2 μm in thickness, partly because it lowers the voltage distributed to the liquid crystal recording layer, and partly because it makes resolution worse. However, too thin a dielectric layer does not only make image noise through interaction with the lapse of time, but also offers a permeation problem due to defects such as pinholes when it is formed by coating. Permeability due to defects such as pinholes varies depending on the solid content of the coating material, the type and viscosity of the solvent used, etc. Thus, coating thickness may be suitably determined, but should be up to 10 μm, preferably 0.1 μm to 3 μm. In consideration of the distribution of voltage applied on the respective layers, it is preferable that a material having a high dielectric constant is made thin.

For the material that forms the dielectric layer 31, use may be made of inorganic materials such as $SiO_2$, $TiO_2$, $CeO_2$, $Al_2O_3$, $Si_3N_4$, AlN, TiN, $MgF_2$, ZnS, silicone dioxide plus titanium dioxide, zinc sulfide plus magnesium fluoride, and aluminum oxide plus germanium, which may be formed into the dielectric layer 31 by suitable techniques such as evaporation, sputtering, and chemical vapor deposition (CVD). Alternatively, an aqueous solution of a water-soluble resin less compatible with an organic solvent, for instance, polyvinyl alcohol, aqueous polyurethane, or water glass may be formed into the dielectric layer 31 by suitable techniques such as spin coating, blade coating, and roll coating. Moreover, a coatable fluorocarbon resin may be used as well. In this case, the fluorocarbon resin may be dissolved in a fluorine solvent, followed as by spin coating, blade coating, or roll coating.

For the coatable fluorocarbon resin, use is preferably made of fluorocarbon resins such as those disclosed in JP-A 4-24728, etc., and an organic material that is formed into film in a vacuum system, for instance, poly-para-xylene or polyvinyl alcohol.

According to the information recording system mentioned above, information is recorded thereon by exposure to light and by the orientation of liquid crystals. By choice of a suitable liquid crystal/resin combination, it is possible to impart a memory function thereto with no erasure of the oriented and visualized information. This memory function can, however, be removed by heating the recording system to a high temperature in the vicinity of isotropic phase transition temperature, the recording system can again be used for recording information.

The foregoing is the detailed explanation of the construction and material of the interlayer in the integrated type of information recording system.

Figure 10:
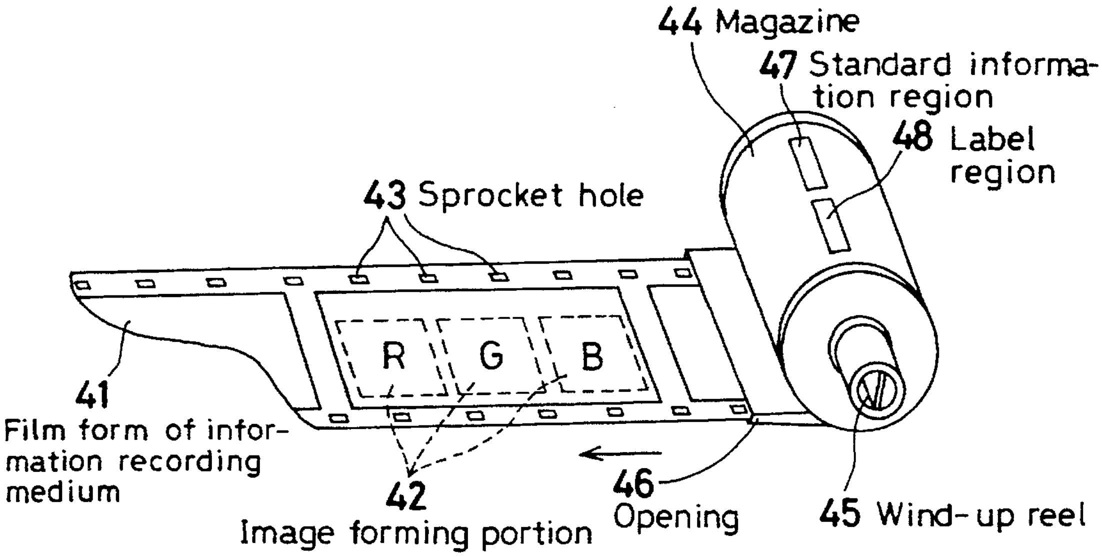
FIG. 10 is a schematic view showing the external appearance of an integrated type of information recording system packaged and received in a magazine.

In FIG. 10, illustrating another embodiment of the present invention, there is schematically shown the external appearance of a packaged type of integrated information recording system received in a magazine. In FIG. 10, reference numeral 41 represents a film form of information recording system, and 42 stands for a set of image forming portions on the film form of information recording system 41, on which images of the three primary colors R, G and B are to be recorded. Reference numeral 43 represents a plurality of sprocket holes, in which a sprocket of image capturing equipment is engaged when the film form of information recording system 41 is unrolled. Reference numeral 44 stands for a magazine that is a packaging case. Reference numerals 45 and 46 indicate a wind-up reel around which the film form of information recording system 41 is wound and an opening through which the film form of information recording system 41 is unrolled, respectively. Reference numerals 47 and 48 indicate a region on the surface of the magazine 44, on which standards are described, and a region on the surface of the magazine 44, on which a label is pasted, respectively.

As illustrated in FIG. 10, a plurality of an integrated type of information recording media are arranged in a row on a continuous film form of substrate provided with the feed sprocket holes 48 on both side edges. This continuous form of substrate is rolled around the wind-up reel 44 in the tightly closable magazine 44, thereby forming a packaged type of integrated information recording system.

With the film form of information recording system 41 unrolled through the opening 6, a plurality of sets of image forming portions 42 are successively fed out in a side-by-side manner to record a plurality of pieces of information successively.

Recorded on the standard region is the information for identifying the type and sensitivity of the information recording system, the maximum recordable number, etc., and recorded on the label region are product name, serial number, production date, etc.

Figure 11:
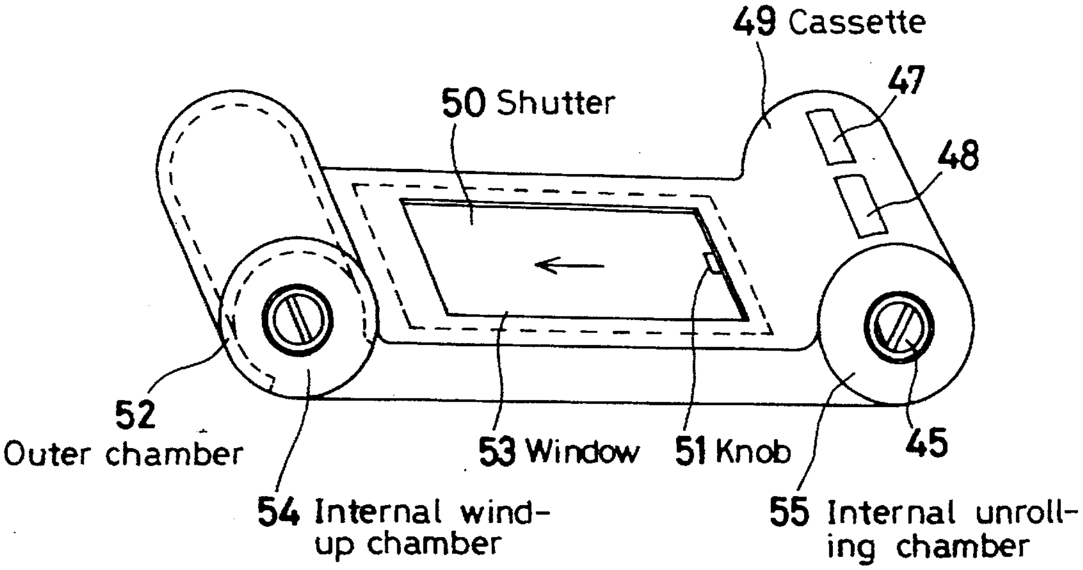
FIG. 11 is a schematic view showing the external appearance of a packaged type of integrated information recording system packaged and received in a cassette.

FIG. 11 illustrates the external appearance of a packaged type of integrated information recording system received in a cassette. In FIG. 11, the same parts as in FIG. 10 are indicated by the same numerals.

In FIG. 11, reference numeral 49 stands for a cassette in which an integrated type of information recording system is received, and 50 represents a shutter located in an information recording region for protecting the information recording system received inside. The shutter is opened when the information recording system is loaded in image capturing equipment or recording/reproducing equipment, but is normally closed up. Reference numeral 51 indicates a knob held by opening/closing means when the information recording system is loaded in the equipment.

Reference numeral 52 represents an outer chamber. While the shutter 50 is opened, a substantial portion of the shutter 50 is stored in the outer chamber. The shutter 50 is formed of a material having suitable rigidity and flexibility. With the shutter 50 moved in a direction shown by an arrow and opened, it is bent following the contour of the outer chamber and stored therein. With the shutter moved in the direction opposite to the direction shown by an arrow and closed up, it is returned to the original flat shape to ensure that a window 53 in the cassette 49 can be closed up.

Reference numeral 54 represents an internal wind-up chamber, wherein the film form of information recording system with information recorded thereon is stored in roll form. Reference numeral 55 indicates an internal unwind chamber 55, wherein the film form of information recording system with no information recorded as yet is stored in roll form.

Figure 12:
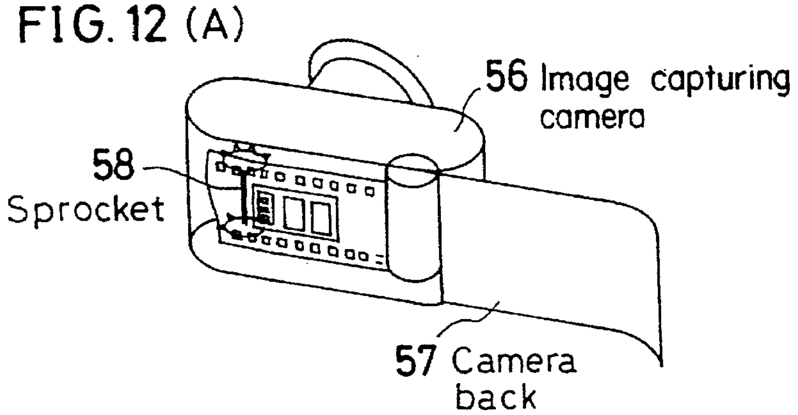
FIGS. 12(A) and 12(B) are schematic views showing a packaged type of integrated information recording system received in an image capturing device.
Figure 12:
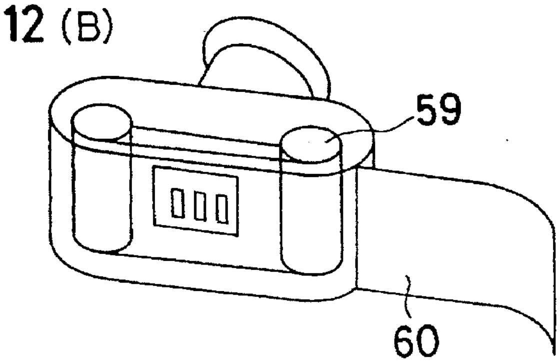

Referring to FIG. 12, there is schematically shown a packaged type of integrated information recording system according to the present invention, which is received in an image capturing device. FIG. 12 (A) illustrates the packaged type of integrated information recording system received in a magazine while FIG. 12(B) shows the packaged type of integrated information recording system received in a cassette. In FIG. 12, reference numerals 56 and 59 represent image capturing cameras, 57 and 60 cameral backs, and 58 a sprocket.

As illustrated in FIG. 12, the information recording system may be loaded in the image capturing camera 56 in the same manner as it is loaded in a normal camera using photographic silver halide film.

Referring here to a noticeable difference between a normal camera and the camera according to the present invention, the normal camera should be handled with care so as to protect photographic silver halide film against exposure to light before photographs are taken, because an image of light is recorded on the film in the form of a latent image upon exposure to light. For the camera with the packaged type of integrated information recording system according to the present invention loaded therein, on the other hand, such care is not needed, because no image is recorded thereon only by exposure to light. Since information is recorded with voltage applied on the electrode layer, however, it is required that the information recording system be provided with an electrode terminal (see FIGS. 14 and 15), which is electrically connected to a power feeding terminal of the image capturing camera (see FIG. 17).

Figure 13:
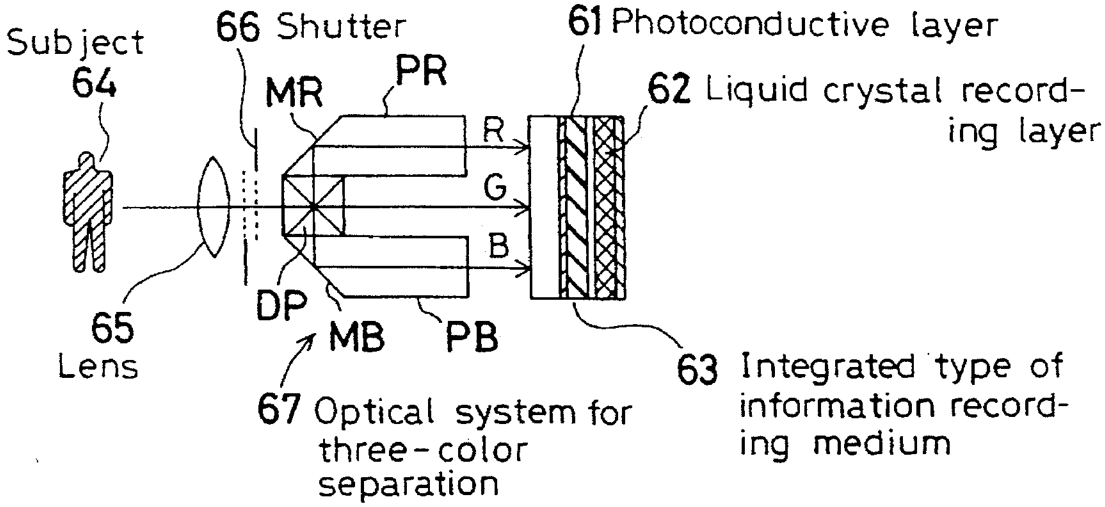
FIGS. 13(A) and 13(B) are schematic views showing an image capturing optical system of an image capturing camera.
Figure 13:
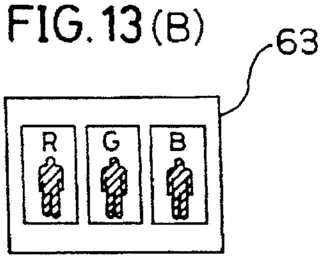

Referring to FIG. 13, there is schematically shown an optical system of the image capturing camera 56. FIG. 13(A) shows the optical system while FIG. 13(B) illustrates images recorded on an information recording medium. In FIG. 13, reference numeral 61 represents a photo-conductive layer which manifests conductivity by irradiation with light, and 62 a liquid crystal recording medium wherein liquid crystals are so oriented at an applied voltage that the light scattering state varies. Reference numeral 63 stands for an integrated type of information recording medium comprising such parts as above mentioned. Details of the integrated type of information recording medium 63 will be referred to later. In FIG. 13, reference numeral 64 represents a subject, 65 a lens for forming an optical image of the subject 64 on the integrated type of information recording medium 63, 66 a shutter, and 67 an optical system for three-color separation.

Upon the shutter 66 opened as shown in FIG. 13, the image of the subject 64 passing through the lens 65 is incident on the optical system 67 for three-color separation, where it is separated into three colors R (red), G (green) and B (blue). The image of each color is then formed on the integrated type of information recording medium 63.

In this state, a given voltage pulse is applied across the first and second electrode layers with the photo-conductive layer 61 and liquid crystal recording layer 62 located inside, so that the image of the subject 64 formed on the integrated type of information recording system 63 is recorded on the liquid crystal recording medium 62.

Figure 14:
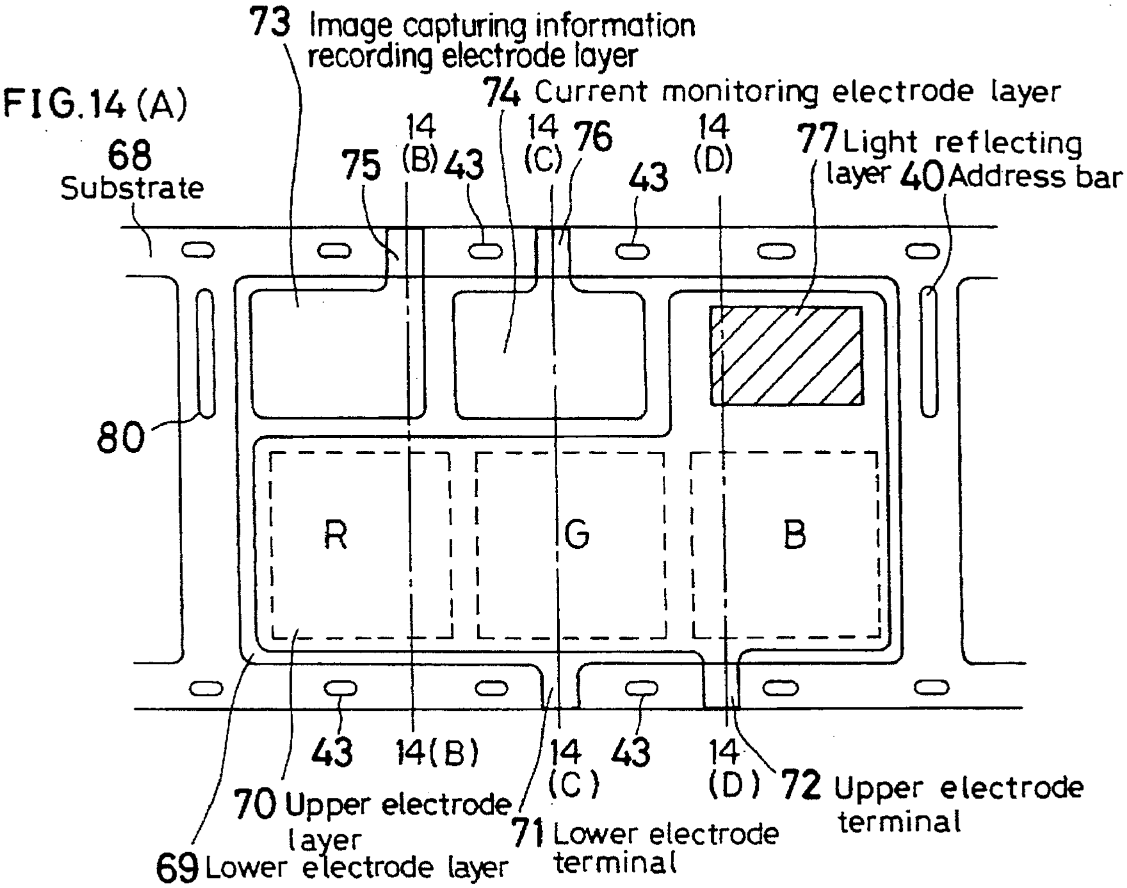
FIGS. 14(A)–14(D) are schematic views showing one construction of an integrated type of information recording system according to the present invention.
Figure 14B:
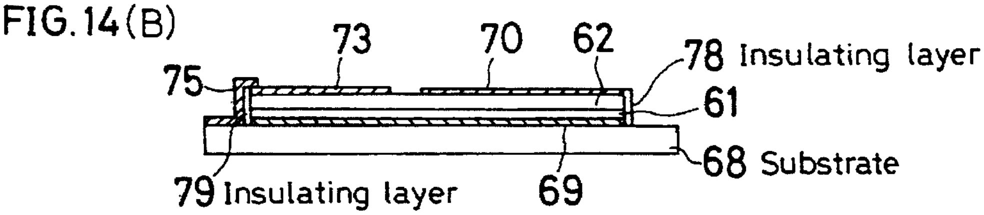
Figure 14C:
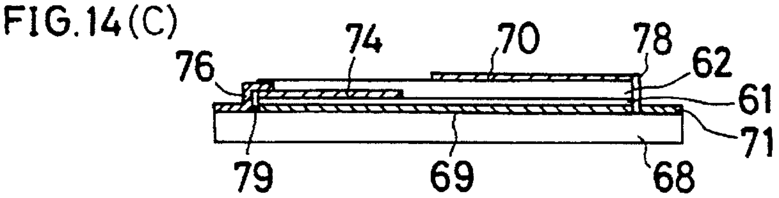
Figure 14D:
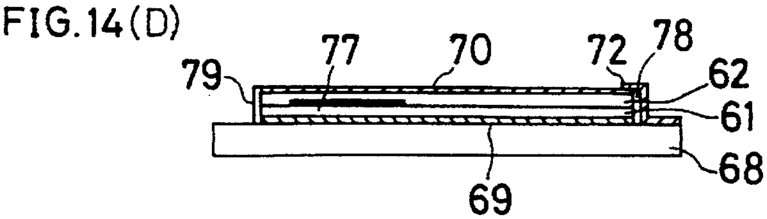

FIG. 14 illustrates one construction of the integrated type of information recording medium 63, with FIG. 14(A) being a plan view, and FIGS. 14(B), 14(C) and 14(D) being sectional views taken along the lines BB', CC' and DD' in FIG. 14(A).

In FIG. 14(A), reference numeral 68 represents a substrate formed of plastics or other material, 69 represents a lower electrode layer formed on the substrate 68 over an information recording region, and 70 represents an upper electrode layer formed on the liquid crystal recording layer 62 over a range that covers information recording portions 42 and a light reflecting layer 77. Reference numeral 71 stands for a lower electrode terminal for making an electrical connection between the lower electrode layer 69 and external equipment, and 72 an upper electrode terminal for making an electrical connection between the upper electrode layer 70 and external equipment.

Reference numeral 73 represents an image capturing information recording electrode layer, 75 an image capturing information recording electrode terminal for making an electrical connection between the image capturing information recording electrode layer 73 and external equipment, 74 a current monitoring electrode layer, and 76 a current monitoring electrode terminal for making an electrical connection between the current monitoring electrode layer 74 and external equipment. Reference numeral 77 stands for a light reflecting layer that enables the transmittance of the liquid crystal recording layer to be monitored.

Reference numeral 80 represents an address bar with a locating mark integral with address information, which is located on the side of the substrate 68 opposite to the side on which the image forming portions are formed.

As can be seen from FIG. 14(B), the substrate 68 is provided thereon with the lower electrode layer 69, on which there is provided the photoconductive layer 61, on which there is provided the liquid crystal recording layer 62. The liquid crystal recording layer 62 may be stacked either directly or through an interlayer formed of a dielectric material (see FIG. 17) on the photoconductive layer 61.

On the liquid crystal recording layer 62 there are provided the upper electrode layer 70 and the image capturing information recording electrode 73, with the edge portions being provided with insulating layers 78 and 79 so that they are electrically insulated in the edge directions. The image capturing information recording electrode terminal 75 is extended from the image capturing information recording electrode layer 73 onto a peripheral portion of the substrate 68.

As can be seen from FIG. 14(C), the substrate 68 is provided thereon with the lower electrode layer 69, and the lower electrode terminal 71 is extended from the lower electrode layer 69 onto a peripheral portion of the substrate 68.

The lower electrode layer 69 is provided thereon with the photoconductive layer 61, on which there is partly provided the current monitoring electrode layer 74, and the current monitoring electrode terminal 76 is extended from the current monitoring electrode layer 74 onto a peripheral portion of the substrate 68.

The photoconductive layer 61 and lower electrode layer 69 are provided thereon with the liquid crystal recording layer 62, on which the upper electrode layer 70 is formed.

As can be seen from FIG. 14(D), the substrate 68 is provided thereon with the lower electrode layer 69, on which there is provided the photoconductive layer 61, on which there is partly provided the light reflecting layer 77. The light reflecting layer 77 and the photoconductive layer 61 are provided thereon with the liquid crystal recording layer 62, on which there is provided the upper electrode layer 70. The upper electrode terminal 72 is extended from the upper electrode layer 70 onto a peripheral portion of the substrate 68.

Figure 15A:
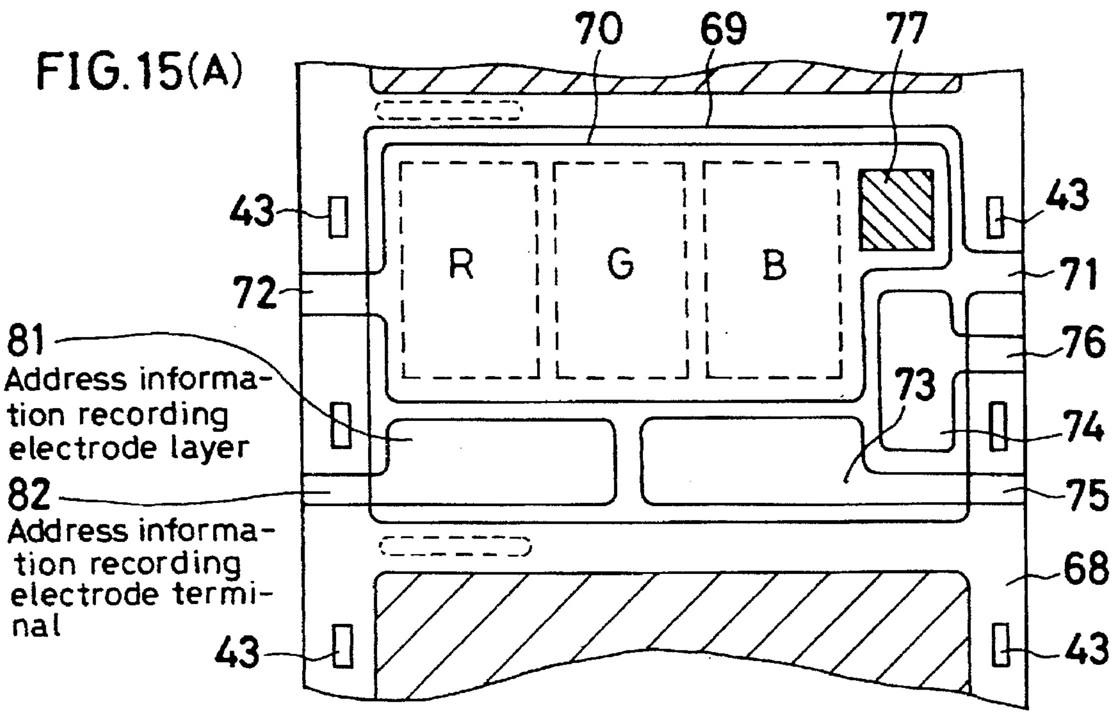
FIGS. 15(A)–15(C) are schematic views showing another construction of an integrated type of information recording system according to the present invention.
Figure 15B:
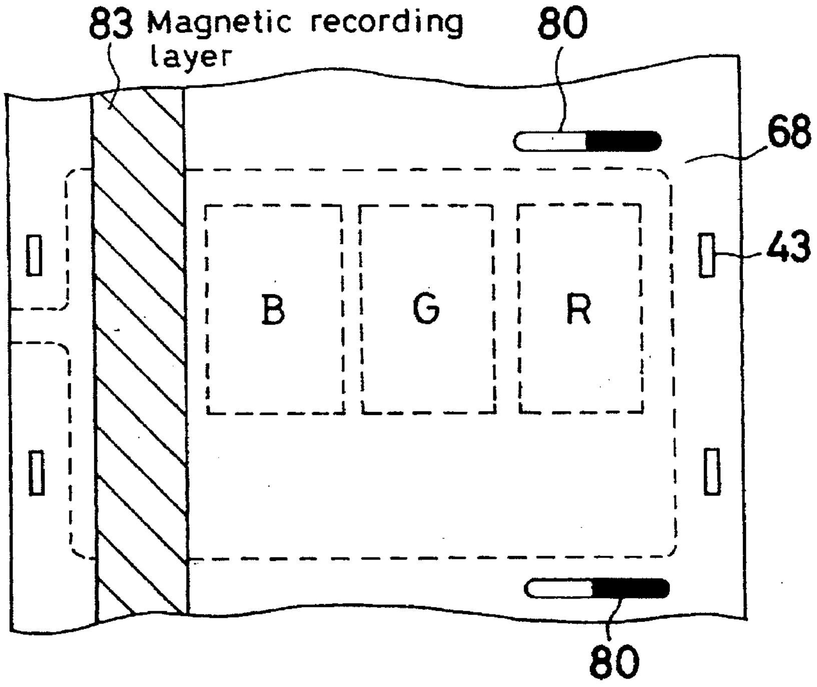
Figure 15C:
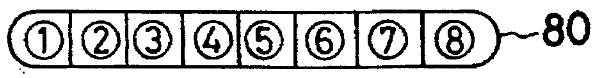

FIG. 15 illustrates another construction of the integrated type of information recording medium 63. FIG. 15(A) shows the front surface of the medium, FIG. 15(B) the back surface of the medium, and FIG. 15(C) an address bar. Reference will now be chiefly made to differences between FIGS. 14 and 15.

In FIG. 15(A), reference numeral 81 represents an address information recording layer formed on a liquid crystal recording layer 62. A lower electrode layer 71 is opposed to this recording layer 81 with the liquid crystal recording layer 62 and photoconductive layer 61 located therebetween, so that address information can be recorded on a region defined thereby. Reference numeral 82 represents an address information recording electrode terminal located on a peripheral portion of a substrate 68 for making an electrical connection between the address information recording electrode layer 81 and external equipment.

The address information is position information on the substrate of the integrated type of information recording system on which an image is taken or has been taken. Before the image is taken or whenever the image is taken, the address information is written on the recording system to enable an unrecorded region to be retrieved or inform the user of the number of the remaining recordable regions.

The image capturing information recorded by the image capturing information recording electrode layer 73 (FIGS. 14 and 15) is information about the date, time and place at which an image is taken, and incidental comments and sounds, serves to identify the image taken, and includes various pieces of additional information.

In FIG. 15(B), reference numeral 83 represents a striped form of magnetic recording layer. For magnetic recording, this magnetic recording layer 83 is formed on the (back) side of the substrate 68 in opposition to the side thereof on which image forming portions are formed. Recordable on the magnetic recording layer 83 are some pieces of information other than image information, for instance, image capturing information, address information, and sound information.

Reference numeral 80 represents an address bar formed on the back side of the substrate 68, which is composed of a locating mark and address information as above mentioned. By reading this locating mark, it is possible to precisely locate a given portion on a continuous film form of integrated information recording system, so that given information can be recorded thereon. By use of the address information, it is possible to precisely grasp the number of portions with images recorded thereon and the number of the remaining recordable portions when a plurality of images are successively recorded.

Thus, the address information and image capturing information can be recorded on or reproduced from a plurality of media. Accordingly, the integrated type of information recording system of the present invention enables a wide range of choice to be given to the construction of image capturing equipment (camera), a wide degree of freedom to be imparted to image capturing equipment design, and image capturing systems to be applied over a wide range.

FIG. 15(C) is a schematic view showing one example of the construction of the address bar (in the case where up to 16 sets of image forming portions are used). As illustrated in FIG. 15(C), the address bar 80 is composed of eight element portions (1) to (8) (which correspond to 1-byte information). For instance, (1) to (5) are assigned to the address information (5 bits) while (6) to (8) are painted out as the locating mark (3 bits). The given information is expressed by "0" and "1", and is imparted to the element portions (1) to (8) in pattern form. For instance, "0" and "1" may be discriminated by differences in the reflectivity of light, color, interference, etc. It is here noted that in addition to the optical pattern, a magnetic recording pattern may be provided by the provision of a magnetic recording layer.

It is also noted that the number of element portions defining the address bar is not always limited to eight; the required number of element portions may be provided in correspondence to the number of sets of image forming portions.

Figure 16:
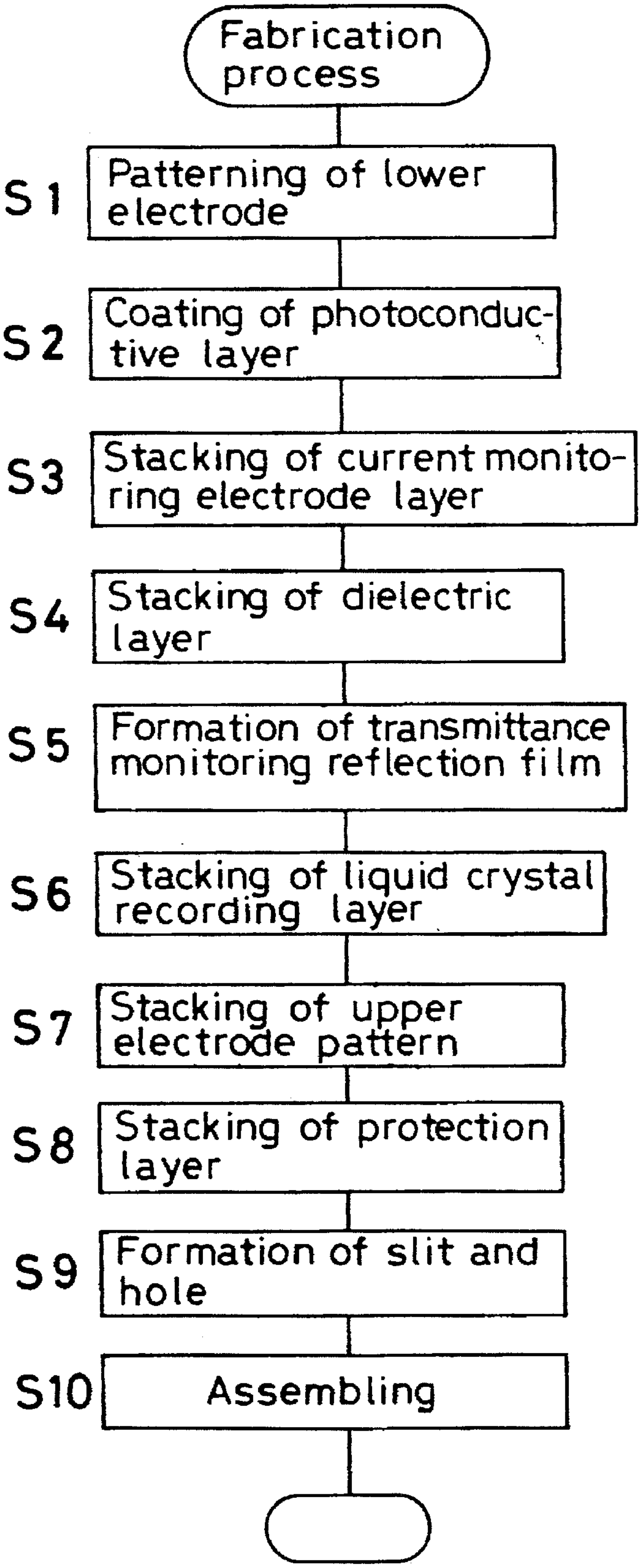
FIG. 16 is a flow chart showing a process of fabricating a packaged type of integrated information recording system according to the present invention.

How to fabricate the integrated type of information recording system will now be explained. FIG. 16 is a flow chart showing the process of fabricating the packaged type of information recording system. Referring first to FIG. 16, an ITO (indium tin oxide) coating film is formed on a continuous film form of substrate made of plastic or other material having surface smoothness and flexibility, and then patterned to form a lower electrode layer (a second electrode layer). This patterning may be carried out by etching, using a resist, a dry mask, etc. In this case, while the lower electrode layer may be overall formed of the same material, it is understood that it may be partly formed of metal such as Au or Al.

In particular, an electrode terminal is made of material different from that of the electrode layer. The lower electrode terminal, when it is in a thin film form of conductive material, may be formed by ion plating, sputtering, evaporation, CVD, etc., and when it is in a thick film form of conductive material, may be formed by the printing of silver paste, the soldering or spot welding of indium, etc. (S1).

After the lower electrode has been uniformly patterned on the continuous film form of substrate, a photoconductive layer is formed by coating processes such as dip coating, blade coating, air knife coating, kiss coating, double-roller coating, extrusion coating, and spray coating. This photoconductive layer is uniformly formed all over the surface of the continuous film form of substrate including the patterned lower electrode portion. However, ends slit with a narrow width on the continuous film form of substrate and provided with both electrode terminals, i.e., striped portions, are excluded (S2).

Then, a current monitoring electrode 16 is stacked on, and extended along the edge of the continuous film form of substrate while it overlaps the lower electrode with the photoconductive layer formed thereon. In this case, an insulating layer 39 is previously formed to insulate the electrode 16 from the lower electrode. This stacking operation may be carried out using a dry mask, etc., (S3). Subsequently, a transparent interlayer formed of a dielectric material (as will be described later) is stacked on the electrode 16 (S4), and then provided thereon with a transmittance monitoring reflection layer 77 (S5).

It is here noted that the interlayer may be formed by stacking aqueous resin or gelatin on the electrode 16 by the same coating process as used in the case of the above-mentioned photoconductive layer. Alternatively, the interlayer may be formed by stacking an inorganic insulating layer ($SiO_2$, $Al_2O_3$, ZnS, etc.) on the electrode 16 by evaporation, sputtering, ion plating, CVD or the like. The transmittance monitoring reflection layer may be formed by the evaporation, sputtering, ion plating, and other processing of Au, Al, etc.

A liquid crystal recording layer is stacked on the transmittance monitoring reflection layer by the same coating process as used for the above-mentioned photoconductive layer, which has been stacked on the interlayer (S6).

Then, an upper electrode (first electrode layer), an address information recording electrode layer and an image capturing information recording electrode layer are patterned using a dry mask, etc., after insulating layers 78 and 79 have previously been formed to ensure that the lower electrode is insulated therefrom. This electrode, too, is extended onto a peripheral portion of the continuous film form of substrate (S7). Following this, a transparent protection film formed of a dielectric material is stacked on the upper electrode (S8).

The thus fabricated continuous film form of substrate with the electrodes, liquid crystal recording layer, photo-electric sensor, etc., formed thereon is slit to a narrow width and provided with sprocket holes (S9). Then, this is received in a magazine as shown in FIG. 10 or a cassette, or built in a camera as shown in FIG. 11 (S10).

In use, the recording system is connected to, and fixed by, a connector receptor of a camera or other device, as shown in FIG. 12(B), so that images can be successively recorded on a plurality of image forming portions by the moving means of the camera and address information, image capturing information and other information can be recorded on the predetermined portions.

It is here noted that when the address bar and magnetic recording layer are formed on the back side of the continuous film form of substrate, an additional step of processing the back side by gravure printing, stripe coating, etc., is used between the step S8 of providing the protection layer and the step S9.

Figure 17:
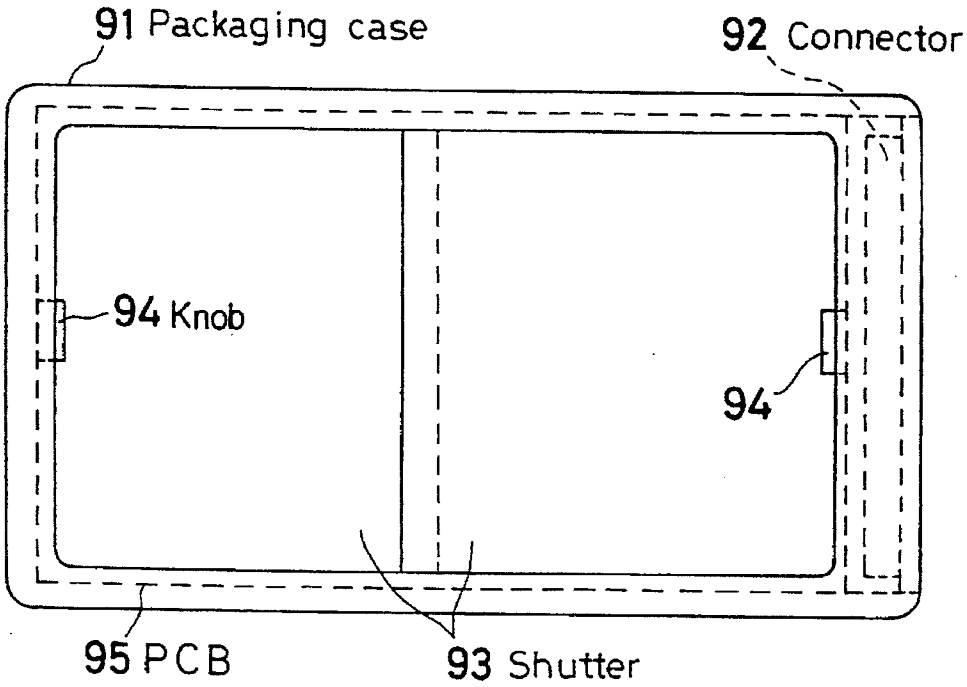
FIG. 17 is a schematic view showing the external appearance of another embodiment of an integrated type of information recording system according to the present invention.

In FIG. 17 illustrating another embodiment of the present invention, the external appearance of the packaged type of integrated information recording system is schematically shown. In FIG. 17, reference numeral 91 represents a packaging case formed by molding an insulating material such as a plastic material. Reference numeral 92 stands for a connector having a multiplicity of connecting pins, which is electrically connected to the package type of integrated information recording system and external equipment such as an image capturing device (e.g., a camera) for the purposes of information communications, image control, power supply, etc. Reference numeral 93 indicates a shutter, which is opened when images are recorded on, or reproduced from, the information recording system. The shutter is closed, on the other hand, when the information recording system is removed out of the image capturing device for storage or carrying. In FIG. 17, the shutter 92 is shown in the form of a horizontally slidable door. However, it may be constructed in the form of a vertically slidable door. Reference numeral 94 represents a knob of the shutter 93, through which the opening/closing mechanism of the image capturing device, etc., has an action on the shutter 93. Reference numeral 95 shown by a dotted line stands for a PCB (printed circuit board), by which the information recording system and the connector are supported and fixed, and electrically connected to each other.

Figure 18:
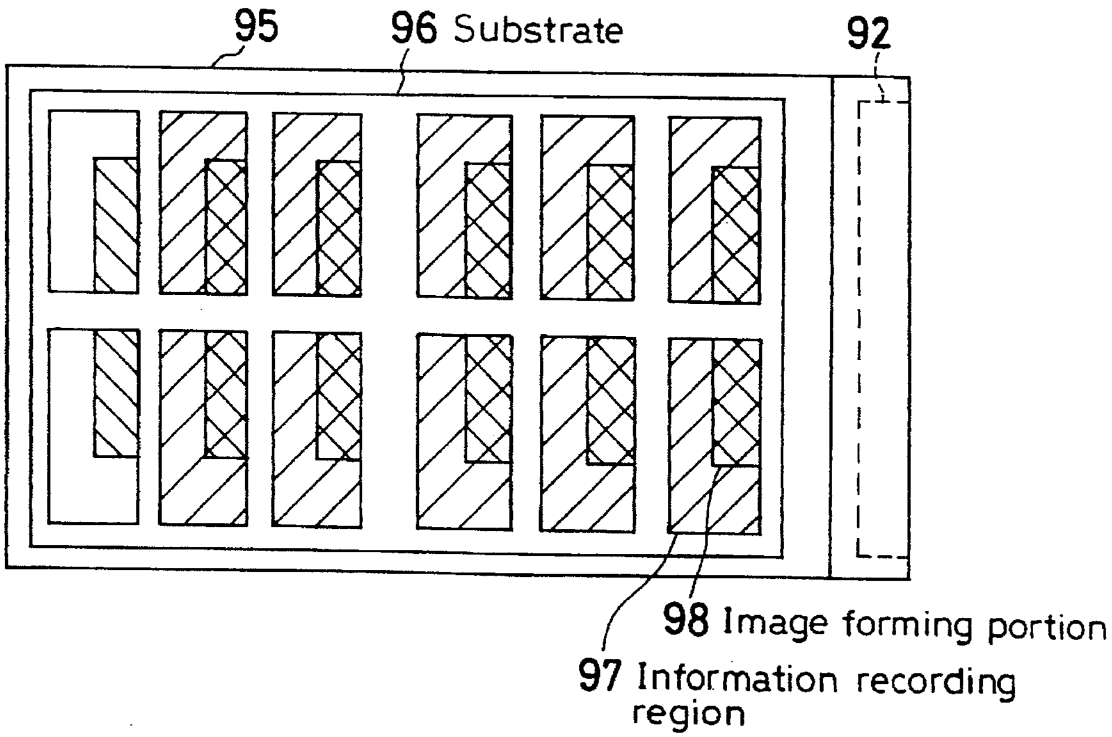
FIG. 18 is a schematic view showing the construction of a recording system received in a case.

FIG. 18 illustrates one construction of the recording system received in the packaging case. In FIG. 18, the same parts as shown in FIG. 17 are indicated by the same reference numerals. In FIG. 18, reference numeral 96 represents a rectangular substrate which is formed of glass, plastic or other material. Stacked on the substrate 96 are the electrodes, liquid crystal recording layer, photoconductive layer, etc. Provided on an information recording region shown at 97 on the substrate 96 is an optical pattern. A plurality of such information recording regions are arranged in matrix form. Reference numeral 98 stands for an image forming portion on which image information is to be recorded. When the image information is in the form of a color image, images are recorded in a row on three regions corresponding to the three primary colors R, G and B.

Figure 19:
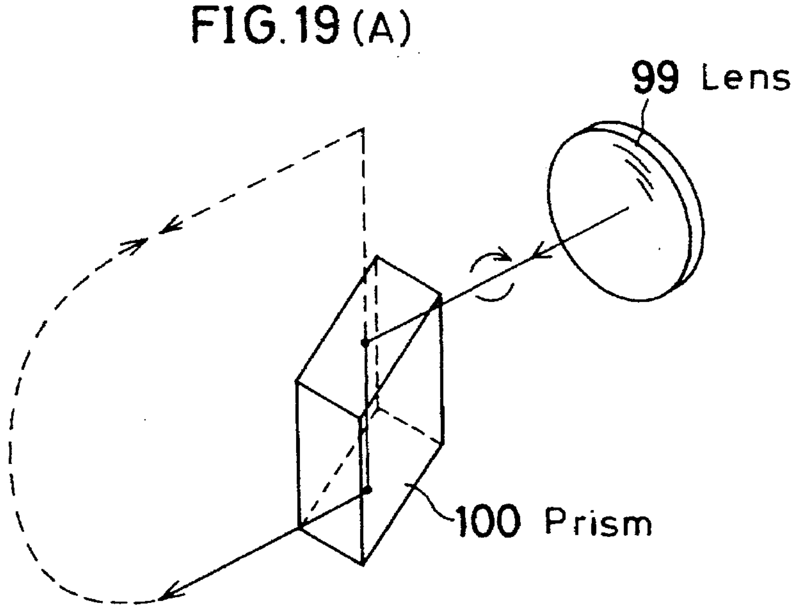
FIGS. 19(A) and 19(B) are schematic views showing an image capturing camera.
Figure 19:
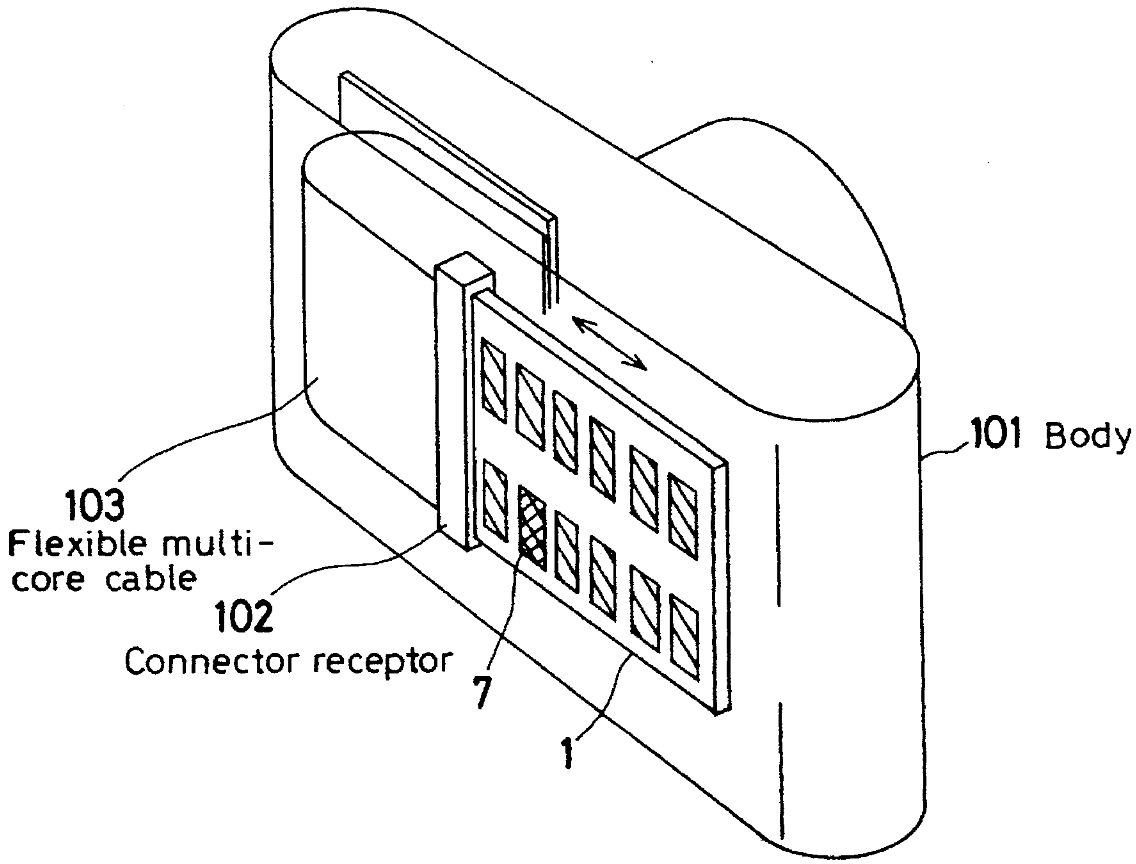

FIG. 19 illustrates one example of an image capturing device (camera) with which the packaged type of integrated information recording system of the present invention is used. FIG. 19(A) shows an optical system while FIG. 19(B) is a perspective view of a camera body with the recording system built in it. In FIG. 19(A), reference numeral 99 represents an image forming lens, and 100 a prism for switching over an image forming position from an upper to lower position, and vice versa. Although not shown in FIG. 19(A), an optical system for three-color separation, for instance, is located in the rear of the prism 100 and somewhere between the lens 99 and the recording system.

In FIG. 19(B), reference numeral 101 represents a body, and 102 a connector receptor for receiving a connector 92. This connector receptor 102 is designed such that it is moved in the direction shown by an arrow and stopped, so that it can cooperate with the prism 100 to select a suitable information recording region 7. Reference numeral 103 stands for a flexible multi-core cable connected at one end to the connector 102, and at the other end connected to a circuit board within the image capturing device.

FIG. 20 illustrates one construction of the image recording region. FIG. 20(A) is a plan view, and FIGS. 20(B), (C) and (D) are sectional views taken along the lines BB', CC' and DD' in FIG. 20(A).

Figure 20A:
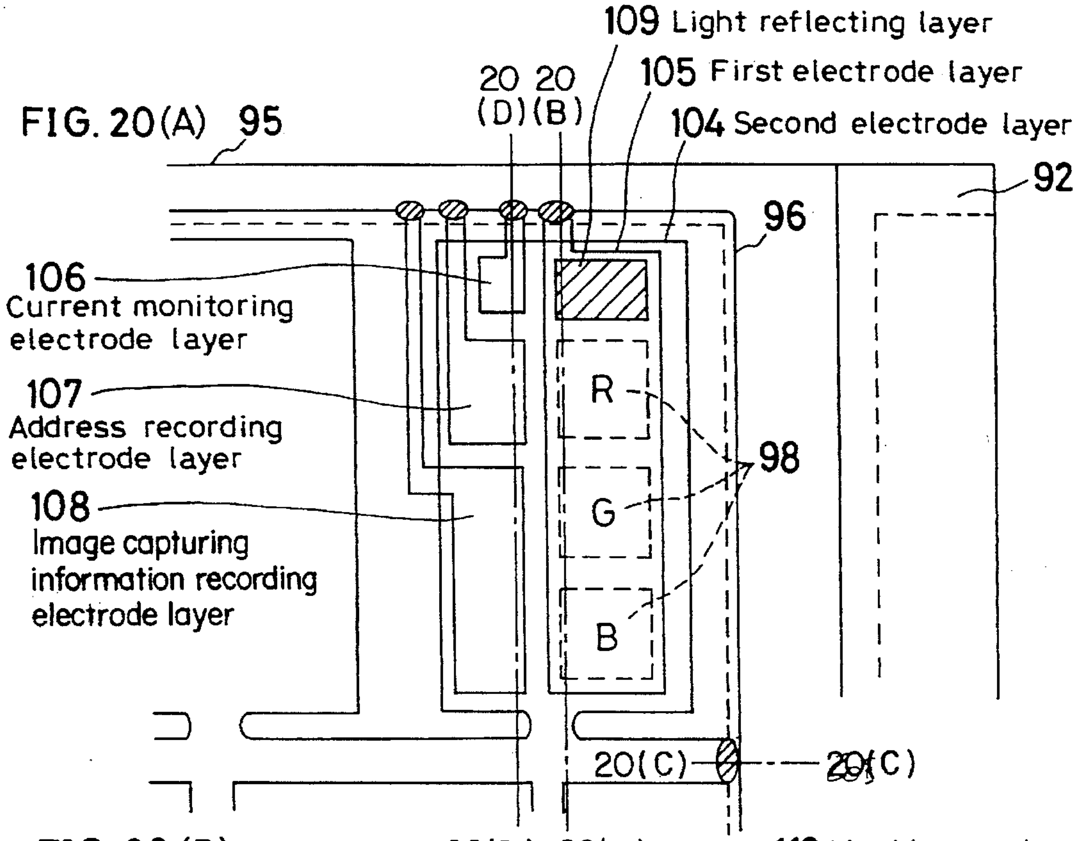
FIGS. 20(A)–20(D) are schematic views illustrating an information recording region.

In FIG. 20(A), reference numeral 104 represents a second electrode layer formed on a substrate 96, and 105 a first electrode layer formed on a liquid crystal recording layer. Reference numerals 106, 107 and 108 represent a current monitoring electrode layer, an address information recording electrode layer and an image capturing information recording layer, respectively. As illustrated, the second electrode layer 104 is located below a region including all other electrode layers.

Reference numeral 109 represents a light reflecting layer which is located between the liquid crystal recording layer and a photoconductive layer so as to monitor the transmittance of the liquid crystal recording layer, and covered over a given area with the first electrode layer 105.

Figure 20B:
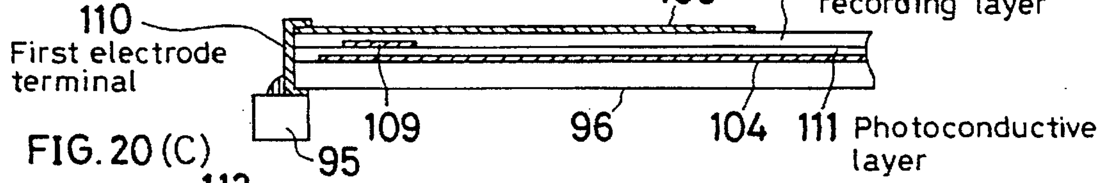

In FIG. 20(B), reference numeral 110 represents a first electrode terminal which makes an electrical connection between the first electrode layer 105 and an interconnecting line of PCB 95. Reference numerals 111 and 112 represent a photoconductive layer and a liquid crystal recording layer, respectively.

Figure 20C:
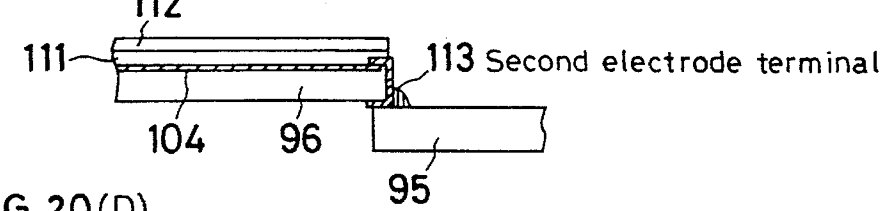

In FIG. 20(C), reference numeral 113 represents a second electrode terminal which makes an electrical connection between the second electrode layer 104 and an interconnecting line of PCB 95.

Figure 20D:
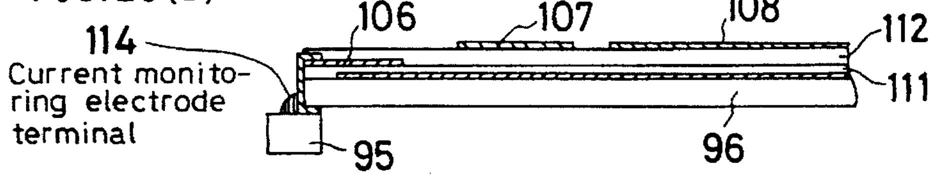

In FIG. 20(D), reference numeral 114 a current monitoring electrode terminal which makes an electrical connection between the current monitoring electrode layer 106 and an interconnecting line of PCB 95.

The address recording electrode 107 and the image capturing information recording layer 108 are likewise electrically connected to interconnecting lines of PCB 95 just as above mentioned.

The address recording electrode layer 107 is provided to record address information, and the address information is position information on the substrate of an integrated type of information recording system on which an image is taken or has been taken. Before the image is taken or whenever the image is taken, the address information is written on the recording system to enable an unrecorded region to be retrieved or inform the user of the number of the remaining recordable regions.

The image capturing information recording electrode layer 108 is provided to record image capturing information, and the image capturing information is information about the date, time and place at which an image is taken, and incidental comments and sounds, serves to identify the image taken, and includes various pieces of additional information.

Figure 21:
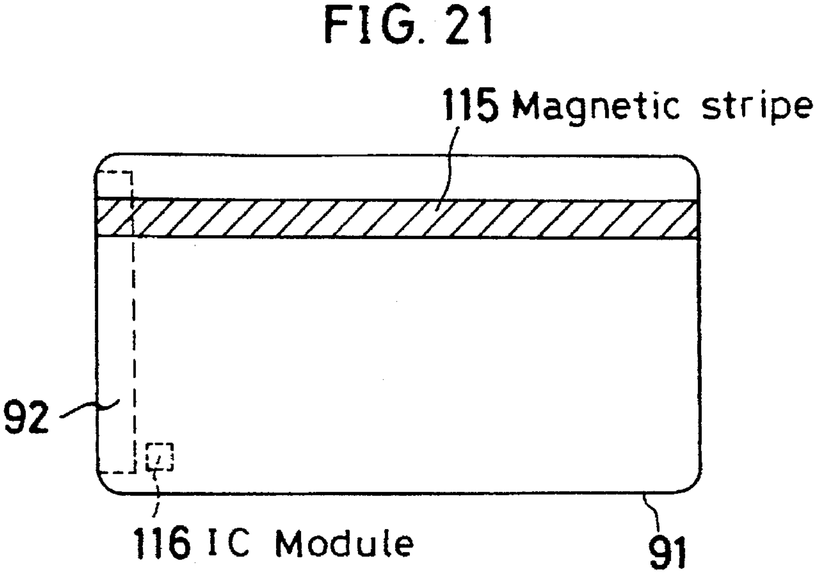
FIG. 21 is a schematic view showing one example of the back surface of an integrated type of information recording system.

FIG. 21 illustrates one example of the back surface of the packaged type of integrated recording system according to the present invention. The back surface of the packaged type of integrated recording system shown in FIG. 21 is protected, and provided thereon with a magnetic stripe 115 for magnetic recording. A built-in IC module 116 enables information to be electrically written on an IC memory thereof.

Information can thus be recorded optically, magnetically and electrically, so that not only image information but also sound information, ID information, security information, etc., can be stored in respectively suitable forms.

Since the recording system shown in FIG. 21 is protected on the back surface, every information inclusive of image information is recorded on, and reproduced from, the front surface thereof having the shutter.

Figure 22A:
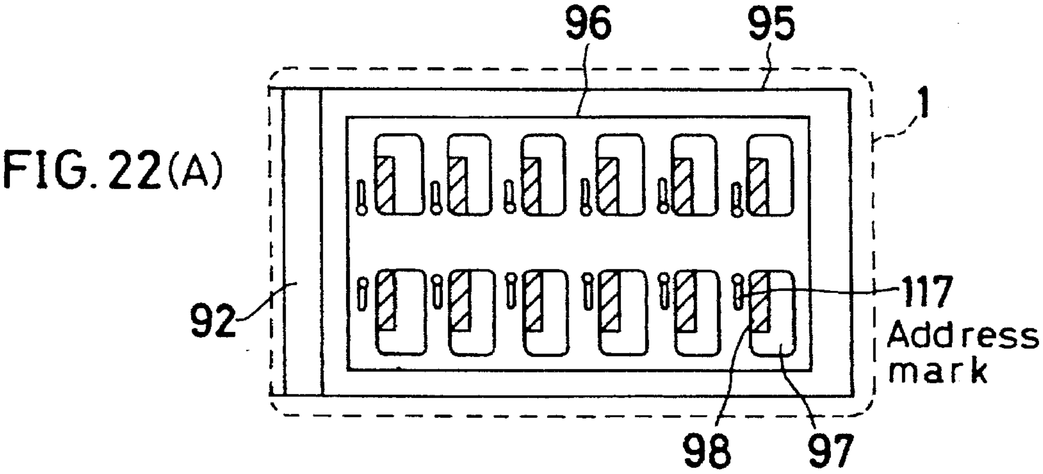
FIGS. 22(A) and 22(B) are schematic views showing one arrangement of address marks provided on the back surface of the substrate of an integrated type of information recording system.
Figure 22B:
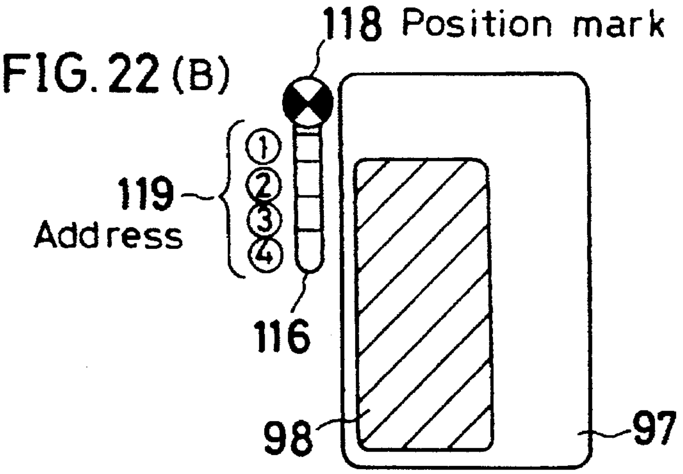

FIG. 22 illustrates an embodiment of the packaged type of integrated information recording system according to the present invention, wherein an address mark is provided on the back surface of a substrate 95, i.e., the surface on which a second electrode layer 104 is not provided. FIG. 22(A) is a general view of the recording system while FIG. 22(B) is a partially enlarged view thereof. As in the case of the front surface, the packaged type of integrated information recording system shown in FIG. 22 is provided on the back surface with an openable and closable shutter. When no shutter is provided, the back surface of the substrate 95 itself becomes the back surface of the packaged type of integrated information recording system.

In FIG. 22(A), reference numeral 117 represents an address mark. The address mark 117 is located on a given position which is spaced away from, and precisely determined relative to, an information recording region 97.

As illustrated in FIG. 22(B), the address mark 117 is composed of a position mark 118 which can be precisely and easily read by an optical sensor and a plurality of addresses 119 which specify the address mark 117 (and, for instance, consists of four element portions as illustrated). Each address 119 is expressed by "0" and "1", and is imparted to the element portions (1) to (4) in pattern form. For instance, "0" and "1" may be discriminated by differences in the reflectivity of light, color, interference, etc. It should here be noted that in addition to the optical pattern, a magnetic recording pattern may be provided by the provision of a magnetic recording layer.

Figure 23:
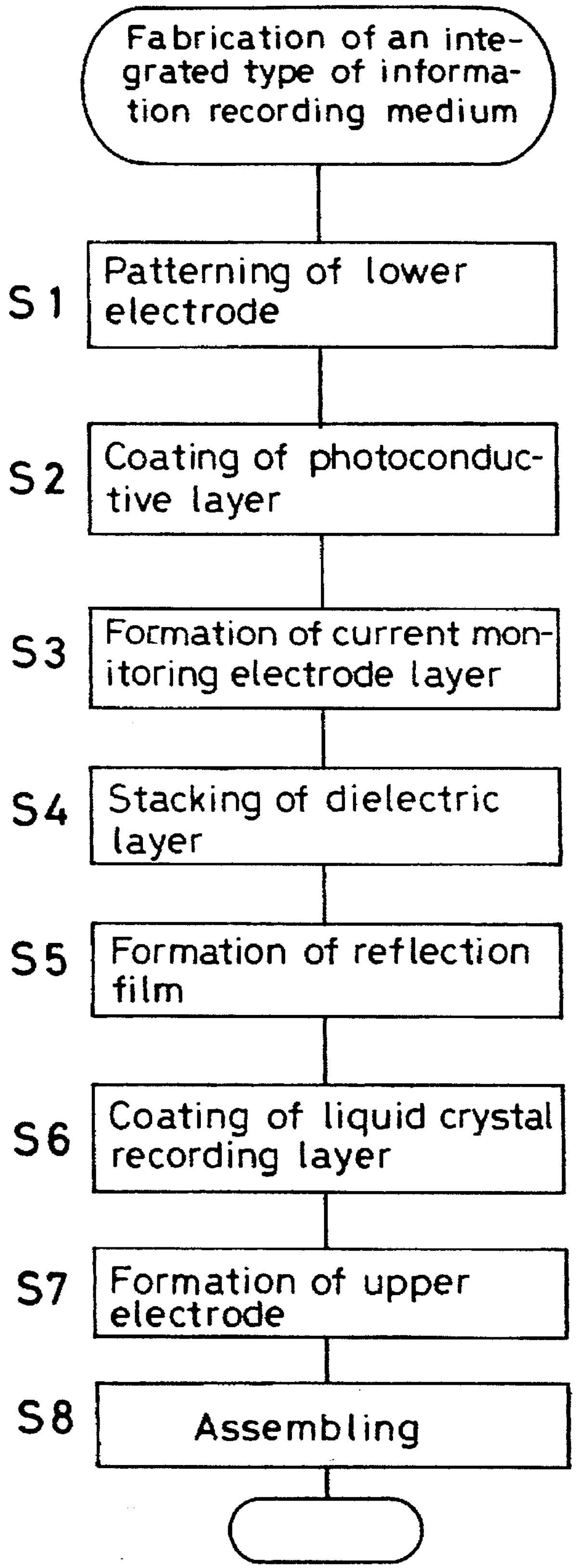
FIG. 23 is a flow chart showing a process of fabricating a packaged type of integrated information recording system.

An account will now be given of how to fabricate the integrated type of information recording system. FIG. 23 is a flow chart illustrating the process of fabricating the packaged type of integrated information recording system. Referring to FIG. 23, an ITO (indium tin oxide) coating film is formed on a rectangular substrate made of plastics or the like, and then patterned to form a lower electrode layer (a second electrode layer 104). This patterning may be carried out by etching, using a resist, a dry mask, etc. In this case, while the lower electrode layer may be overall formed of the same material, it is understood that it may be partly formed of metal such as Au or Al.

In particular, an electrode terminal is made of material different from that of the electrode layer. The lower electrode terminal, when it is in a thin film form of conductive material, may be formed by ion plating, sputtering, evaporation, CVD, etc., and when it is in a thick film form of conductive material, may be formed by the printing of silver paste, the soldering or spot welding of indium, etc. (S1).

After the lower electrode has been uniformly patterned on the rectangular card substrate, a photoconductive layer is formed by coating processes such as spinner coating, blade coating, and dip spraying. This photoconductive layer is uniformly formed all over the surface of the card substrate including the patterned lower electrode portion (S2).

Then, a current monitoring electrode 106 for monitoring a dark current through the photoconductive layer is stacked on and extended along the edge of the card substrate while it overlaps the lower electrode with the photoconductive layer formed thereon. This stacking operation may be carried out using a dry mask, etc., (S3). Subsequently, a transparent interlayer is stacked on the electrode 106 (S4), and then provided thereon with a transmittance monitoring reflection layer 109 (S5).

It is here noted that the interlayer may be formed by stacking aqueous resin or gelatin on the electrode 7 by spinner coating, blade coating, dip spraying or the like. Alternatively, the interlayer may be formed by stacking an inorganic insulating layer ($SiO_2$, $Al_2O_3$, ZnS, etc.) on the electrode 106 by evaporation, sputtering, ion plating, CVD or the like. The transmittance monitoring reflection layer may be formed by the evaporation, sputtering, ion plating, and other processing of Au, Al, etc.

A liquid crystal recording layer is stacked on the transmittance monitoring reflection layer which has been stacked on the interlayer (S6).

Then, an upper electrode (a first electrode layer 105), an address recording electrode layer 107 and an image capturing information recording layer 108 are patterned using a dry mask, etc., and extended to a peripheral edge of the card substrate (S7).

The thus fabricated substrate 91 with the electrodes, liquid crystal recording layer, photoelectric sensor, etc., being stacked thereon is mounted on a PCB 95 as shown in FIG. 18, with the electrodes connected to an interconnecting pattern of the PCB. Then, this is received in a packaging case 91 as shown in FIG. 17, which is then built in a camera or the like to assemble a recording system (S8).

In use, as illustrated in FIG. 19(B), the recording system is connected and fixed by a connector receptor 102 of a camera or other device, so that images can be successively recorded on a plurality of image forming portions by the moving means of the camera, and address information, image capturing information, etc., can be recorded as well.

TEMPERATURE DEPENDENCE OF THE LIQUID CRYSTAL RECORDING LAYER

Figure 24:
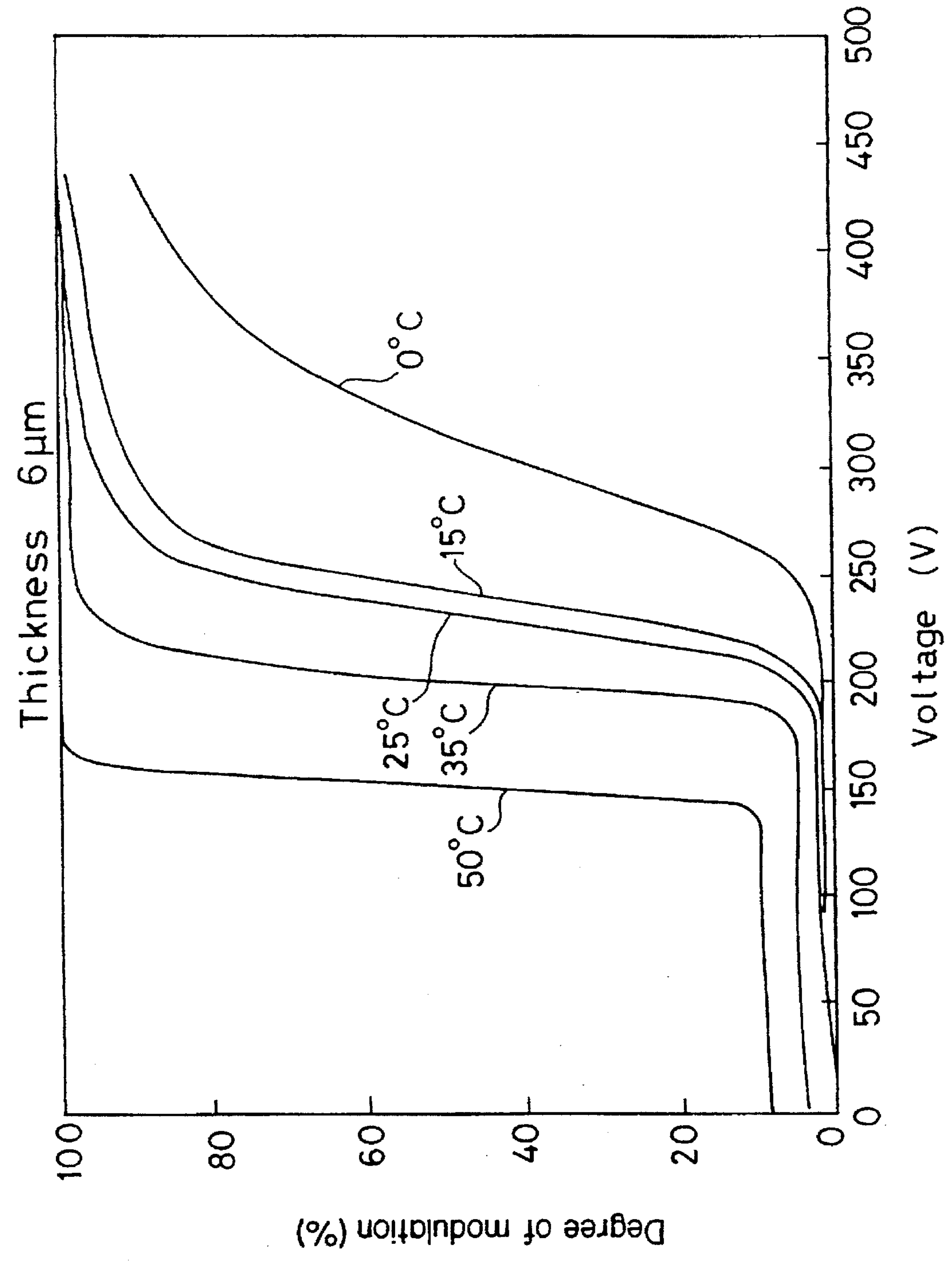
FIG. 24 is a graphical view showing one example of the temperature dependency of a liquid crystal recording layer.

An account will now be given of the temperature dependence of the liquid crystal recording layer used in the present invention. FIG. 24 is a graphical view showing one example of the temperature dependence of the liquid crystal recording layer used in the present invention, with the voltage (volt) applied on the liquid crystal recording layer 22 as abscissa and the degree of modulation (%) as ordinate.

Referring here to the "degree of modulation", when the information recorded on the liquid crystal recording layer is optically read, the output of a detector is defined with a scale where the output of the detector is 100% in the maximum light transmitting state and the output of the detector is 0% in the maximum light scattering state.

As can be seen from FIG. 24, the sharp change in the degree of modulation relative to the voltage change reveals that sensitivity is very high. The characteristic change of the degree of modulation depending on temperature, on the other hand, indicates that when the liquid crystal recording layer is used in an environment with temperature changes, temperature, voltage, etc., must be placed under control. FIG. 24 also indicates that the once recorded information can be erased by making use of such characteristics.

In the present invention, temperature, voltage and other conditions should specifically be preset while such characteristics of the liquid crystal recording layer are taken into consideration.

ACTION OF THE PHOTOELECTRIC SENSOR ON THE AMPLIFICATION OF A PHOTO-INDUCED CURRENT

Reference will now be made to the action of the photoelectric sensor 29 on the amplification of a photo-induced current, which is one characteristic feature of the present invention.

When the photoelectric sensor is irradiated with light in pattern form, the photoelectric sensor manifests conductivity, so that the voltage distributed to the information recording layer or the quantity of charges imparted thereto increases with time. Upon the voltage applied on the photoelectric sensor even after the irradiation thereof with light is finished, the photoelectric sensor continues to maintain conductivity although it attenuates gradually, so that the voltage distributed to, or the quantity of charges imparted to, the information recording layer can continue to increase with time. Then, the voltage or the quantity of charges forms a voltage or quantity-of-charge pattern having the same form as the light pattern incident on the photoelectric sensor, which, if required, is then converted to a visible pattern to be recorded on the information recording layer.

The action of the photoelectric sensor on the increase in the quantity of charges imparted with time, i.e., the "action on the amplification of a photo-induced current" will now be explained at great length.

Figure 25:
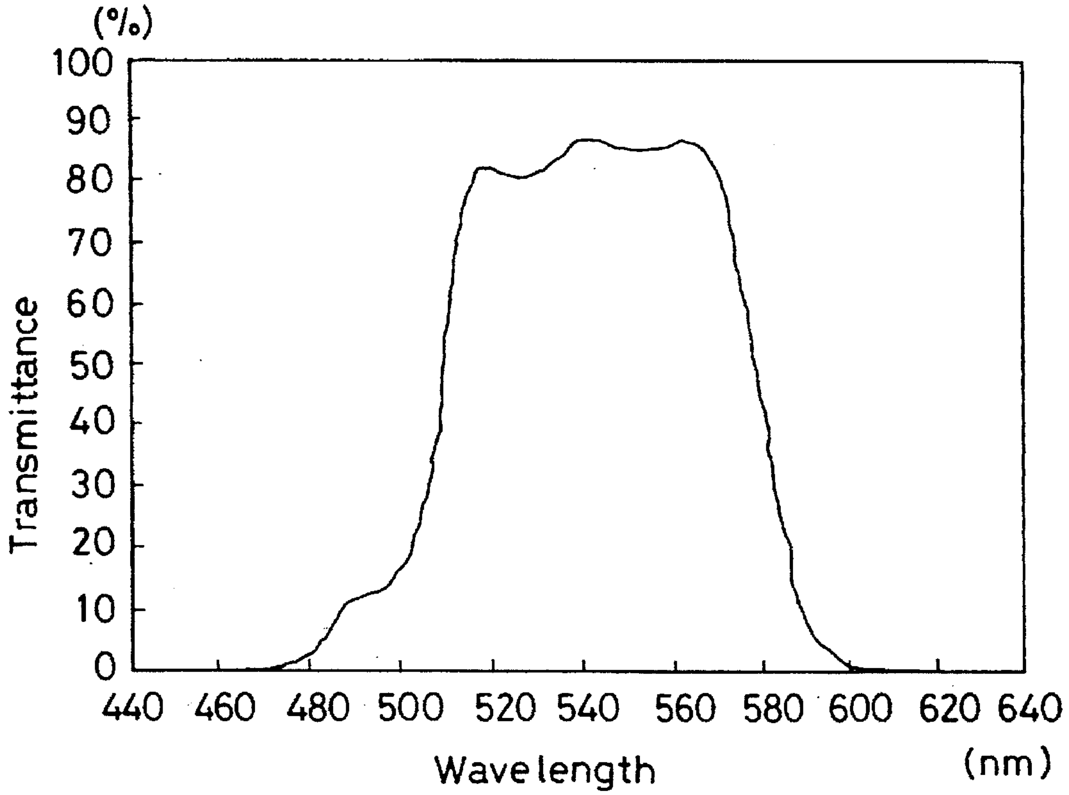
FIG. 25 is a graphical view showing one example of a green filter.

A photoelectric sensor together with a measuring device is fabricated as follows, so that the action of that photoelectric sensor on the amplification of a photo-induced current can be measured. A transparent glass is provided thereon with an ITO electrode, on which there is provided a photoconductive layer, on which there is provided a gold electrode of 0.16 $cm^2$. A d.c. constant voltage is applied across both electrodes with the ITO electrode as positive, and 0.5 seconds after the initiation of application of voltage the photoelectric sensor is irradiated with light from the substrate side for 0.033 seconds. From the initiation of application of voltage (t=0), how the values of currents through the photoelectric sensor behaves is measured all during the measuring time. It is here noted that the photoelectric sensor is irradiated with green light selected from light emitted by a light source or xenon lamp (L2274 made by Hamamatsu Photonix Co., Ltd.) through a green filter having the characteristics shown in FIG. 25 (made by Nippon Shinku Kogaku Co., Ltd.), and the intensity of the irradiation light is 20 luxes as measured by an illuminometer (made by Minolta Camera Co., Ltd,).

When the photoelectric sensor is irradiated with light at this intensity, $4.2\times10^{11}$ photons per $cm^2$ are incident on the photoconductive layer, if the power spectra of the light source, the light transmittance of the transparent substrate and ITO film, and the spectral characteristics of the filter are taken into consideration. If all the incident photons are converted to light carriers, the photocurrent generated will theoretically be $1.35\times10^{-6}$ A/$cm^2$.

When the above-mentioned action is measured with the measuring device as mentioned just above, the photo-induced current actually generated in the photoelectric sensor with respect to the theoretical photocurrent (the value of the photo-induced current actually generated in the photoelectric sensor/the value of the theoretical photocurrent) is here defined as the quantum efficiency in that photoelectric sensor. The "photo-induced current" used herein, too, is defined as the value found by subtracting the value of a base current flowing through a portion not irradiated with light from the value of a current flowing through a portion irradiated with light. In other words, the photo-induced current is understood to refer to a current attributable to irradiation with light, which continues to flow during and after irradiation with light, with a value higher than that of the base current, and so is different from the so-called photocurrent.

Thus, the action of the photoelectric sensor according to the present invention on the amplification of the photo-induced current is defined as the behavior of such a photo-induced current.

The photoelectric sensor having an action on the amplification of the photo-induced current according to the present invention, and a photoelectric sensor having no such an action (hereinafter called the comparative sensor) will now be explained with reference to the results of measurement made with the above-mentioned measuring device.

Figure 26:
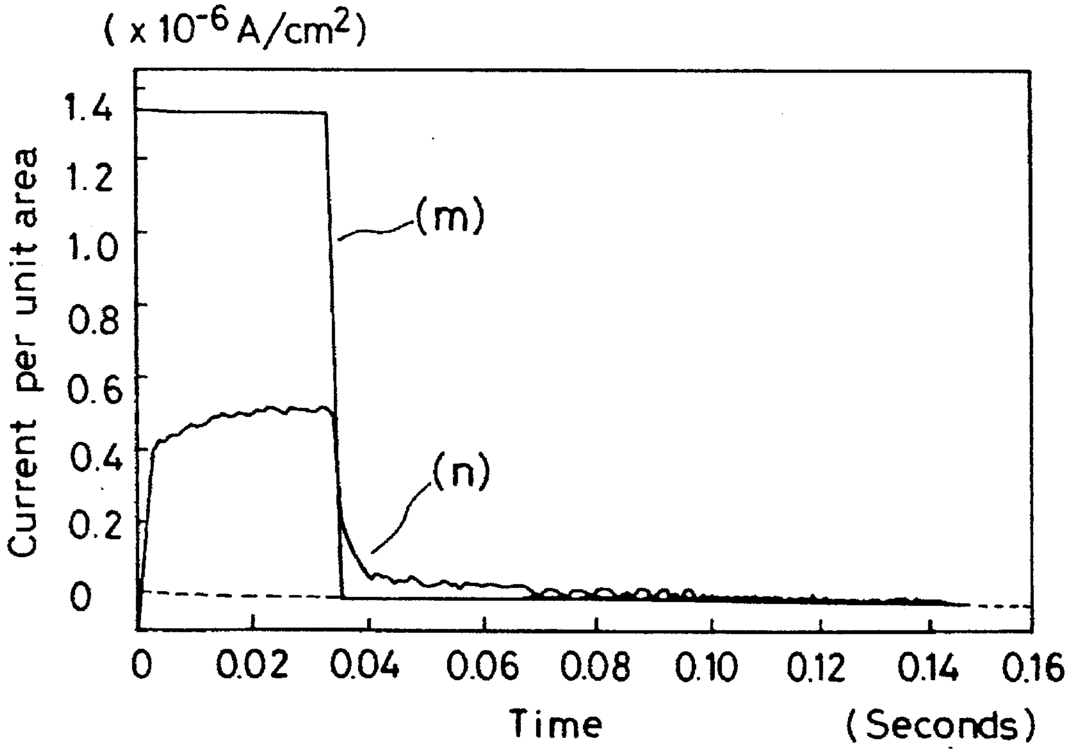
FIG. 26 is a graphical view showing the results, as measured, of a conventional photoelectric sensor having no photo-induced current effect.
Figure 27:
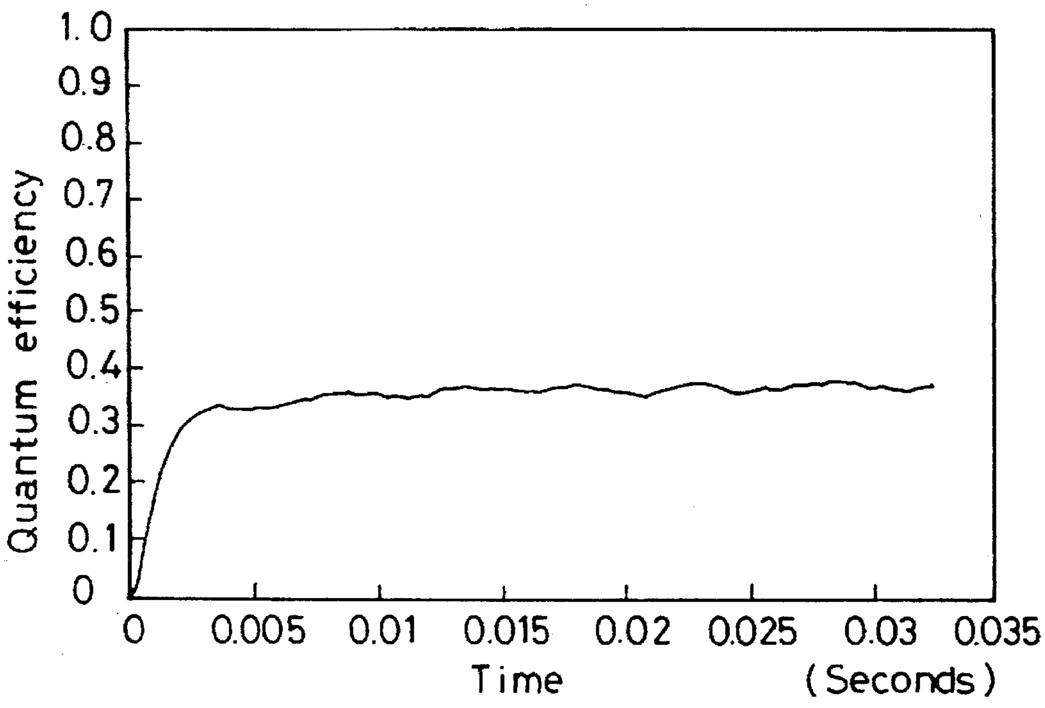
FIG. 27 is a graphical view showing a quantum efficiency change of a photoelectric sensor having no photo-induced current effect while it is irradiated with light.

The results of the comparative sensor as measured are shown in FIG. 26. In FIG. 26, the line (m) is a reference line showing the above-mentioned theoretical value ($1.35\times10^{6}$ A/$cm^2$), and indicates that the sensor is irradiated with light for 0.033 seconds and the application of voltage is maintained even after irradiation with light. The line (n) is actually found using the comparative sensor. A quantum efficiency change during irradiation with light is shown in FIG. 27.

Figure 28:
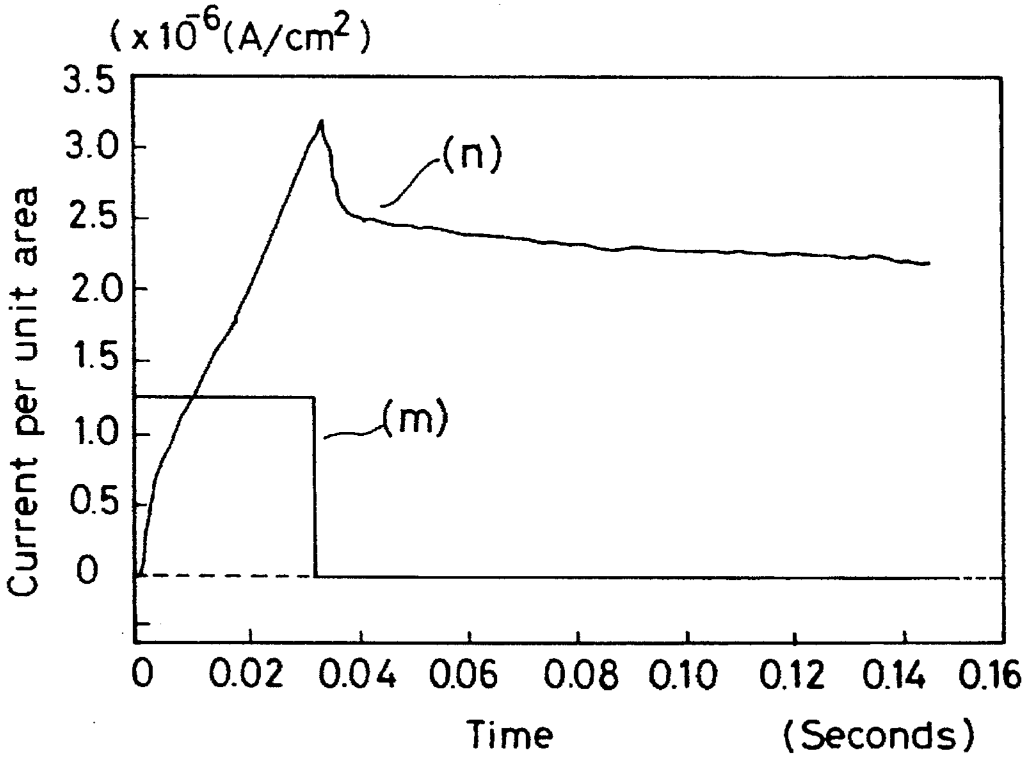
FIG. 28 is a graphical view showing an increase in the photo-induced current through a photoelectric sensor having a photo-induced current effect while it is irradiated with light.
Figure 29:
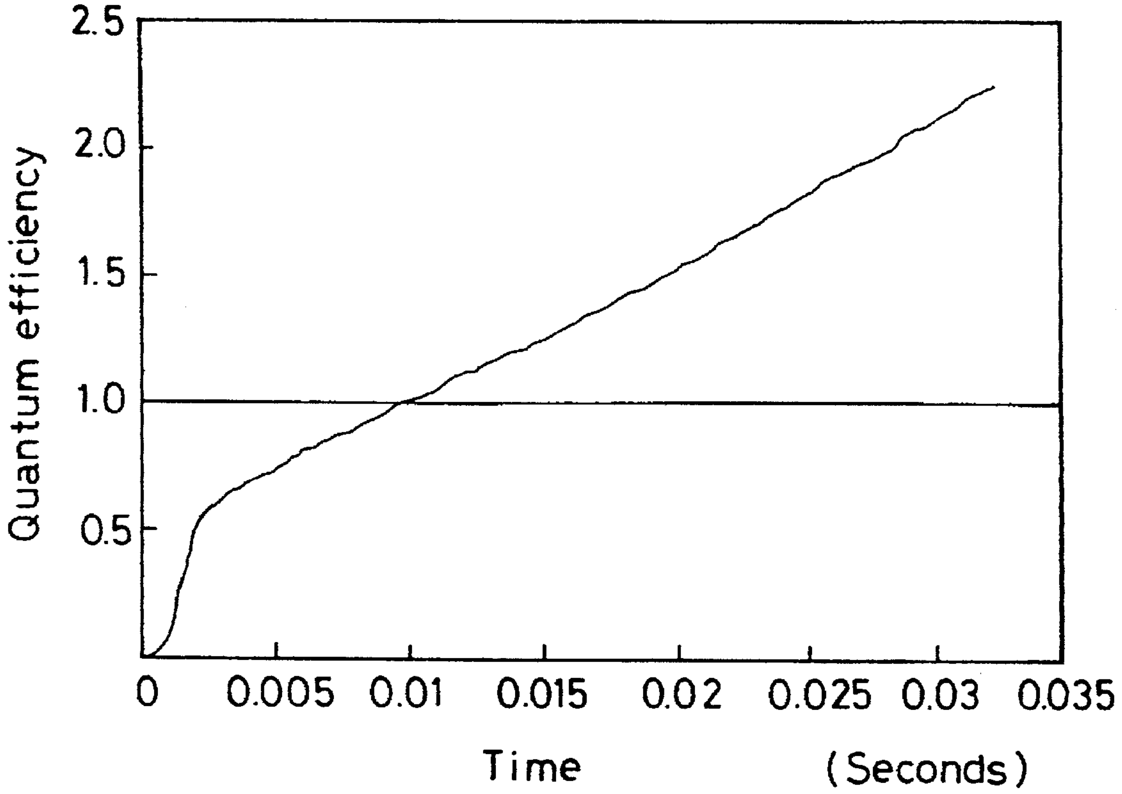
FIG. 29 is a graphical view showing quantum efficiency of the photo-induced current through a photoelectric sensor having a photo-induced current effect while it is irradiated with light.

In the photoelectric sensor according to the present invention, on the other hand, the photo-induced current increases during irradiation with light, as typically shown in FIG. 28, and the quantum efficiency exceeds 1 in about 0.01 second and thereafter continues to increase, as can be seen from FIG. 29 showing the quantum vs. time relation.

With the comparative sensor, any current effective as light information is not obtained even when the application of voltage is maintained after irradiation with light, because the photocurrent is rapidly attenuated concurrently with the completion of irradiation with light. In the photoelectric sensor according to the present invention, however, the photo-induced current continues to flow due to the continued application of voltage after irradiation with light, so that the photo-induced current and so light information can be successively obtained.

SEMICONDUCTIVITY OF THE PHOTOELECTRIC SENSOR

In the photoelectric sensor according to the present invention, it is preferable that the photoconductive layer thereof is a semiconductive material under dark conditions, and that the resistivity thereof under dark conditions is in the range of $10^9$ to $10^{13}$ Ω·cm in view of the density of the current flowing through it. In particular, a photoelectric sensor having a resistivity of $10^{10}$ to $10^{11}$ Ω·cm is found to have a considerably large amplifying action. In a photoelectric sensor having a resistivity exceeding $10^{13}$ Ω·cm, the amplifying action as achieved in the case of the photoelectric sensor according to the present invention is not obtained at a field intensity ranging from $10^5$ V/cm to $10^6$ V/cm. A photoelectric sensor having a resistivity of less than $10^9$ Ω·cm is not preferable because too much current flows through it, and so makes much noise.

For an organic photosensitive material used for general electrophotography, on the other hand, use is made of a material which is an insulating material under dark conditions and has a resistivity of $10^{14}$ to $10^{16}$ Ω·cm under dark conditions. Thus, if the photoelectric sensor according to the present invention is used for electrophotography, the object of electrophotography will be not attained. On the other hand, if the organic photosensitive material used for general electrophotography is applied to the photoelectric sensor according to the present invention, the object of the present invention will not be attained.

Especially when the information recording layer of the information recording system is a liquid crystal recording layer, it is required that the sensitivity of the photoelectric sensor lie in the operating voltage range of liquid crystals. In other words, the contrast voltage lying between the voltage (bright potential) applied on the information recording system at the portion exposed to light at its maximum and the voltage (dark potential) applied on the information recording system exposed to light at its minimum should be included in the operating voltage region of the liquid crystal recording layer and be of a magnitude where given operating amplitude is obtainable.

For instance, it is required that the dark potential applied on the liquid crystal recording layer of the photoelectric sensor at the portion exposed to light at its minimum be preset at or around the operation start potential of liquid crystals. Thus, where the resistivity of the information recording system is $10^{10}$ to $10^{13}$ Ω·cm at normal temperature and an electric field of $10^5$ to $10^6$ V/cm is applied on the photoelectric sensor, the photoelectric sensor is required to have a base current of about $10^{-4}$ to about $10^{-7}$ A/cm$^2$, preferably $10^{-5}$ to $10^{-6}$ A/cm$^2$.

In a photoelectric sensor having a base current falling below $10^{-7}$ A/cm$^2$, no orientation of the liquid crystal recording layer takes place even when it is exposed to light at its maximum. In a photoelectric sensor having a base current exceeding $10^{-4}$ A/cm$^2$, on the other hand, a large current flows through it concurrently with the application of voltage, even when the liquid crystal recording layer is exposed to light at its minimum, resulting in the orientation of the liquid crystal recording layer. Thus, no transmittance difference due to the quantity of exposure is obtained even upon exposure of the photoelectric sensor to light.

Since the operating voltage and range vary depending on the type of liquid crystals, the voltage to be applied and the voltage applying time should be determined while the distribution of voltage to the information recording system is taken into consideration.

According to the present invention as explained above in detail, there can be provided a packaged type of integrated information recording system including a plurality of recording media so integrated in disk form that it can be built in a camera or other device. This information recording system has high sensitivity because the photoelectric sensor having an action on the amplification of a photo-induced current is used. Information can be recorded on the information recording system with high resolution because the photoelectric sensor is combined with the information recording media including liquid crystal recording layers as constitutional elements.

According to the first aspect of the present invention, there is provided a packaged type of integrated information recording system which includes a plurality of rectangular, integrated information recording media radially arranged on a disk substrate centrally provided with a hole, wherein each of said information recording media comprises a liquid crystal recording medium including a liquid crystal-polymer composite layer with polymer balls filled in a liquid crystal phase stacked on a first electrode layer and a photoelectric sensor including a second electrode layer and a photoconductive layer formed on a transparent substrate, said liquid crystal recording medium and said photoelectric sensor being stacked directly, or through an interlayer, on each other while said liquid crystal recording layer and said photoconductive layer are opposed to each other, and said disk substrate being rotatably received in a packaging case. For exposure of images to light and reading images, the window in the case is opened and closed by a shutter to record and read the images on and out of the disk substrate. By rotating and stopping the disk substrate, a plurality of images can be successively recorded on and read out of the disk substrate.

According to the second aspect of the present invention, there is provided an integrated type of information recording system including a plurality of integrated information recording media arranged in a row on a continuous film form of substrate and packaged in a magazine, a cassette or the like. A plurality of rectangular, integrated information recording media are arranged in a row on a film substrate provided with feed holes on both side edges, and are received in a tightly closable case such that the medium can be drawn therefrom. For exposure of images to light and reading images, the film is drawn from the case to record or read the images thereon or therefrom. The film is further drawn and stopped to successively record or read a plurality of images thereon or therefrom.

According to the third aspect of the present invention, a plurality of rectangular, integrated information recording media are arranged in a row on a film substrate provided with feed holes on both side edges, and received in a packaging cassette having a window portion openable and closable by a shutter such that it can be unrolled therefrom. For exposure of images to light and reading images, the shutter is opened or closed to record or read the images on or from the film substrate through the window. The film is further unrolled and stopped to successively record or read a plurality of images.

According to the fourth aspect of the present invention, there is provided a packaged type of integrated information recording system in which a plurality of integrated information recording media are arranged on a card substrate in matrix form. Alternatively, a plurality of rectangular, integrated information recording media are arranged on the card substrate in matrix form, and are fixedly received in a packaging case having a window portion openable and closable by a shutter. For exposure of images to light and reading images, the shutter is opened and closed to record and read the images on and from the card substrate through the window. The card substrate is moved and stopped to successively record and read a plurality of images thereon and therefrom.

In the packaged type of integrated information recording system according to the present invention, the rectangular, integrated information recording medium is provided with an address information recordable region on which address information can be recorded.

In the packaged type of integrated information recording system according to the present invention, the substrate on which the rectangular, integrated information recording medium is formed is provided on the back side with an address information recordable region, on which address information can be recorded.

In the packaged type of integrated information recording system according to the present invention, the rectangular, integrated information recording medium includes a non-image area on which there is formed a image capturing information recordable region, on which image capturing information can be recorded.

In the packaged type of integrated information recording system according to the present invention, the rectangular, integrated information recording medium includes a non-image area on which there is provided a light reflecting layer for monitoring the transmittance of liquid crystals, which enables the transmittance of liquid crystals to be monitored. Thus, information can be well recorded while image capturing conditions are properly controlled.

In the packaged type of integrated information recording system according to the present invention, the rectangular, integrated information recording medium includes a non-image area, on which there is provided a current monitoring electrode layer, said electrode layer being located in opposition to the second electrode layer of the photoelectric sensor through the photoconductive layer. A current flowing through the photoelectric sensor can be monitored by this current monitoring electrode layer. Information can thus be well recorded while image capturing conditions are properly controlled.

By the provision of an overcoat layer between the first electrode layer and the liquid crystal recording layer, the packaged type of integrated information recording system according to the present invention can have durability.

What we claim is:

1. A packaged type of integrated information recording system characterized by including a plurality of rectangular, integrated information recording media radially arranged on a disk substrate, the substrate being centrally provided with a hole, wherein each of said information recording media comprises:

a liquid crystal recording medium including a liquid crystal-polymer composite layer, with polymer balls filled in a liquid crystal phase, stacked on a first electrode layer, and a photoelectric sensor including a second electrode layer and a photoconductive layer formed on the substrate, said liquid crystal recording medium and said photoelectric sensor being stacked directly, or through an interlayer, on each other while said liquid crystal recording layer and said photoconductive layer are opposed to each other, and said disk substrate being rotatably received in a packaging case having a window portion openable and closable by a shutter of the packaging case.

2. A packaged type of integrated information recording system, characterized by including a plurality of rectangular, integrated information recording media arranged in a row on a photographic film, said film having feed holes on both side edges, wherein each of said information recording media comprises:

a liquid crystal recording medium including a liquid crystal-polymer composite layer, with polymer balls filled in a liquid crystal phase, stacked on a first electrode layer; and a photoelectric sensor including a second electrode layer and a photoconductive layer formed on a transparent substrate of the photographic film, said liquid crystal recording medium and said photoelectric sensor being stacked directly or through an interlayer, on each other while said liquid crystal recording layer and said photoconductive layer are opposed to each other, and said film being received in a tightly closable packaging case such that it can be drawn therefrom.

3. A packaged type of integrated information recording system, characterized by including a plurality of rectangular, integrated information recording media arranged in a row on a photographic film, said film having feed holes on both side edges, wherein each of said information recording media comprises:

a liquid crystal recording medium including a liquid crystal-polymer composite layer, with polymer balls filled in a liquid crystal phase, stacked on a first electrode layer; and a photoelectric sensor including a second electrode layer and a photoconductive layer formed on a transparent substrate of the photographic film, said liquid crystal recording medium and said photoelectric sensor being stacked directly, or through an interlayer, on each other while said liquid crystal recording layer and said photoconductive layer are opposed to each other, and said film being received in a packaging cassette having a window openable and closable by a shutter of the packing cassette such that the film can be unrolled therefrom.

4. A packaged type of integrated information recording system, characterized by including a plurality of rectangular, integrated information recording media arranged on a card substrate in matrix form, wherein each of said information recording media comprises:

a liquid crystal recording medium including a liquid crystal-polymer composite layer, with polymer balls filled in a liquid crystal phase, stacked on a first electrode layer; and a photoelectric sensor including a second electrode layer and a photoconductive layer formed on the substrate, said liquid crystal recording medium and said photoelectric sensor being stacked directly, or through an interlayer, on each other while said liquid crystal recording layer and said photoconductive layer are opposed to each other, and said card substrate being fixedly received in a packaging case having a window portion openable and closable by a shutter of the packaging case.

5. The packaged type of integrated information recording system as recited in any one of claims 1 to 4, wherein each of said rectangular, integrated information recording medium includes a non-image area provided with a region on which address information can be recorded.

6. The packaged type of integrated information recording system as recited in any one of claims 1 to 4, wherein the substrate for said rectangular, integrated information recording medium is provided with a region on the back surface of the substrate on which address information can be recorded.

7. The packaged type of integrated information recording system as recited in any one of claims 1 to 4, characterized in that said rectangular, integrated information recording medium includes a non-image area provided with a region on which image capturing information can be recorded.

8. The packaged type of integrated information recording system as recited in any one of claims 1 to 4, characterized in that an overcoat layer is interposed between said first electrode layer and said liquid crystal polymer composite layer.

9. The packaged type of integrated information recording system as recited in any one of claims 2 to 4, characterized in that said rectangular, integrated information recording medium includes a non-image area on which a light reflecting layer for monitoring the transmittance of liquid crystals is formed.

10. The packaged type of integrated information recording system as recited in any one of claims 2 to 4, characterized in that said rectangular, integrated information recording medium includes a non-image area on which a current monitoring electrode layer is formed, said current monitoring electrode layer being opposed to the second electrode layer of said photoelectric sensor through said photoconductive layer.

* * * * *